(12) United States Patent
Zhao et al.

(10) Patent No.: US 11,451,826 B2
(45) Date of Patent: Sep. 20, 2022

(54) LOSSLESS CODING MODE AND SWITCHABLE RESIDUAL CODING

(71) Applicant: Tencent America LLC, Palo Alto, CA (US)

(72) Inventors: Xin Zhao, San Diego, CA (US); Xiang Li, Saratoga, CA (US); Shan Liu, San Jose, CA (US); Cheung Auyeung, Sunnyvale, CA (US); Liang Zhao, Sunnyvale, CA (US); Ling Li, Seoul (KR)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/848,612

(22) Filed: Apr. 14, 2020

(65) Prior Publication Data

US 2020/0329257 A1 Oct. 15, 2020

Related U.S. Application Data

(60) Provisional application No. 62/908,227, filed on Sep. 30, 2019, provisional application No. 62/834,333, filed on Apr. 15, 2019.

(51) Int. Cl.
*H04N 19/615* (2014.01)
*H04N 19/176* (2014.01)
*H04N 19/124* (2014.01)

(52) U.S. Cl.
CPC ......... *H04N 19/615* (2014.11); *H04N 19/124* (2014.11); *H04N 19/176* (2014.11)

(58) Field of Classification Search
CPC .............. H04N 19/124; H04N 19/176; H04N 19/615
See application file for complete search history.

(56) References Cited

U.S. PATENT DOCUMENTS 9,877,035 B2  1/2018  Zou et al.
2013/0336395 A1* 12/2013  Joshi ............... H04N 19/127
                                                     375/240.12

(Continued)

FOREIGN PATENT DOCUMENTS

CN         107302705 A     10/2017
WO    WO 2013/109773 A1    7/2013

(Continued)

OTHER PUBLICATIONS

Benjamin Bross, et al, Versatile Video Coding (Draft 6), Joint Video Experts Team (JVET), of ITU-T SG 16 WP 3 and ISO/IEC JTC 1/SC 29/WG 11, 15th Meeting: Gothenburg, SE, Jul. 3-12, 2019, Document: JVET-O2001-Ve, 456 pages.

(Continued)

*Primary Examiner* — Zhubing Ren
(74) *Attorney, Agent, or Firm* — Arentfox Schiff LLP

(57) ABSTRACT

An apparatus of video decoding can include circuitry configured to receive a lossless mode flag associated with a current block indicating whether a lossless coding mode is applied to the current block, determine that a lossy coding mode is not applied to the current block when the lossless mode flag indicates that the lossless coding mode is applied to the current block, and reconstruct the current block with the lossy coding mode disabled.

13 Claims, 15 Drawing Sheets

(56) References Cited

U.S. PATENT DOCUMENTS

| | | | | |
|---|---|---|---|---|
| 2014/0226721 | A1* | 8/2014 | Joshi | H04N 19/176 375/240.13 |
| 2015/0124865 | A1* | 5/2015 | Kim | H04N 19/136 375/240.02 |
| 2015/0264376 | A1* | 9/2015 | Zou | H04N 19/126 375/240.03 |
| 2015/0326883 | A1* | 11/2015 | Rosewarne | H04N 19/136 375/240.18 |
| 2016/0198154 | A1* | 7/2016 | Hsiang | H04N 19/91 375/240.03 |
| 2017/0180737 | A1* | 6/2017 | Ye | H04N 19/119 |
| 2020/0288173 | A1* | 9/2020 | Ye | H04N 19/186 |
| 2021/0092413 | A1* | 3/2021 | Tsukuba | H04N 19/593 |

FOREIGN PATENT DOCUMENTS

| | | |
|---|---|---|
| WO | WO 2013/109914 A1 | 7/2013 |
| WO | WO 2015/142556 A2 | 9/2015 |

OTHER PUBLICATIONS

International Search Report dated Jul. 16, 2020 in International Application No. PCT/US20/28233, 74 pgs.
Partial European Search Report dated Apr. 9, 2021 in European Application No. 20775161.1, 14 pgs.
European Search Report dated Jul. 23, 2021 in European Application No. 20775161.1, 17 pgs.
European Search Report dated Aug. 10, 2021, 2021 in European Application No. 20775161.1, 1 pg.
Xiaoyu Xiu,, et al., Rext HLS: on lossless coding, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, Document: JCTVC-Q0106, 4 pgs.
Benjamin Bross, et al., Versatile Video Coding (Draft 5), Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-vl, 343 pgs.
B. Bross, et al, Non-CE8: Unified Transform Type Signalling and Residual Coding for Transform Skip, Joint Video Experts Team (JVET) of ITU-T SG 16 WP 3 and ISO/IEC JTC 1/SC 29/WG 11, 13th Meeting: Marrakech, MA, Jan. 9-18, 2019. Document: JVET-M0464-v 1, 11 pgs.
Benjamin Bross, et al., Versatile Video Coding (Draft 6), Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2001-vE, 455 pgs.
Benjamin Bross et al. Versatile Video Coding (Draft 3) Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L1001-v6, 206 pgs.
Mohsen Abdoli, et al. CE8: BDPCM with horizontal/vertical predictor and independently decodable areas (test 8.3.1b), Joint Video Experts Team (JVET) of ITU-T SG 16 WP 3 and ISO/IEC JTC 1/SC 29/WG 11, 13th Meeting: Marrakech. MA, Jan. 9-18, 2019, Document: JVET-M0057, 7 pgs.
Marta Karczewicz et al. Quantized Residual BDPCM (JVET-N0413), 10 pgs.
Benjamin Bross et al, Versatiie Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1001-v6. 300 pgs.
Marta Karczewicz et al. CE8-related: Quantized residual BDPCM, Joint Video Experts Team (JVET) of ITU-T SG 16 WP 3 and ISO/IEC JTC 1/SC 29/WG 11, 14th Meeting Geneva, CH, Mar. 19-27, 2019, Document: JVET-N0413, 5 pgs.
Gary J. Sullivan, et al. Requirements for Future Video Coding (FVC), ITU—Telecommunications Standardization Sector, Study Group 16 Question 6, Video Coding Experts Group (VCEG), 56th Meeting: Jul. 17-21, 2017, Turin, IT, Document VCEG-BD03, 5 pgs.

* cited by examiner

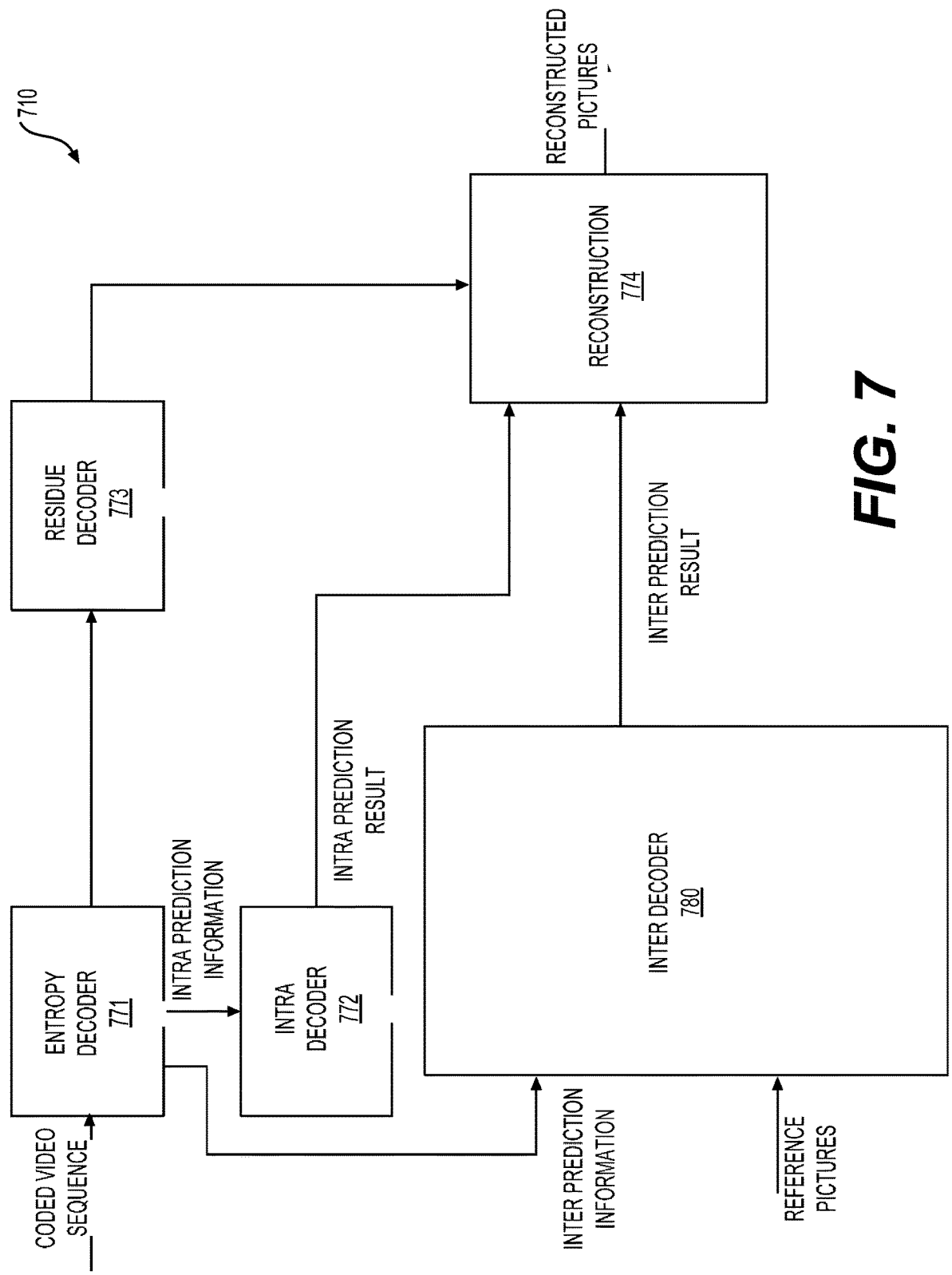

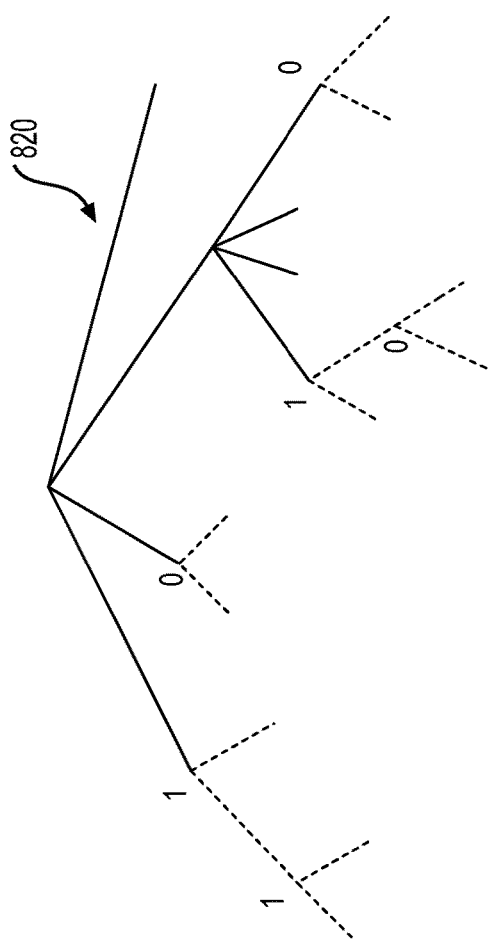
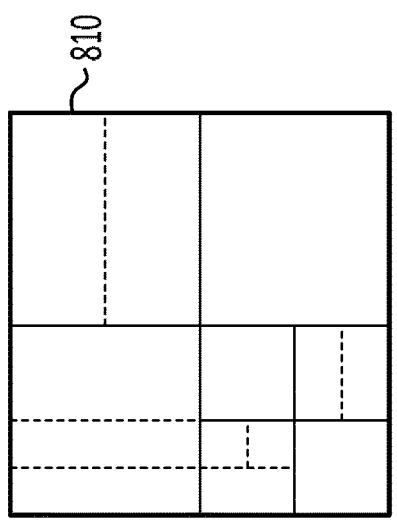
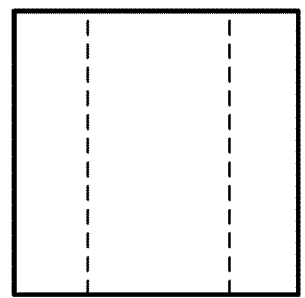
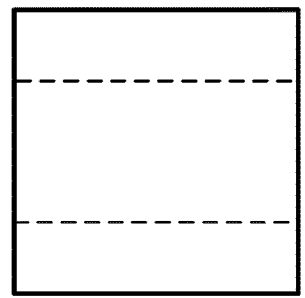
FIG. 8A
FIG. 8B
FIG. 9A
FIG. 9B

Inputs to this process are:

- a location ( xCurr, yCurr ) specifying the top-left sample of the current block relative  the top-left sample of the current picture component, /1200

- the variables nCurrSw and nCurrSh specifying the width and height, respectively, of th    rrent block,

- a variable cIdx specifying the colour component of the current block.

- an (nCurrSw) x (nCurrSh) array predSamples specifying the predicted samples of the current block.

- an (nCurrSw) x (nCurrSh) array resSamples specifying the residual samples of the current block.

Output of this process is a reconstructed picture sample array recSamples

Depending on the value of the colour component cIdx, the following assignments are made:

- If cIdx is equal to 0, recSamples corresponds to the reconstructed picture sample array $S_L$ and the function clipCidx1 corresponds to Clip1$_Y$.

- Otherwise, if cIdx is equal to 1, recSamples corresponds to the reconstructed chroma sample array $S_{Cb}$ and the function clipCidx1 corresponds to Clip1$_C$.

- Otherwise (cIdx is equal to 2), recSamples corresponds to the reconstructed chroma sample array $S_{Cr}$ /1201 and the function clipCidx1 corresponds to Clip1$_C$.

Depending on the value of slice_lmcs_enabled_flag, the following applies: /-1202

- If slice_lmcs_enabled_flag is equal to  0 or cu_lossless_mode_flag is equal to 1,  the (nCurrSw)x(nCurrSh) block of the reconstructed samples recSamples at location ( xCurr, yCurr ) is derived as follows for i = 0..nCurrSw − 1, j = 0..nCurrSh − 1: /1203 recSamples[ xCurr + i ][ yCurr + j ] = clipCidx1( predSamples[ i ][ j ] + resSamples[ i ][ j ] )

- Otherwise (slice_lmcs_enabled_flag is equal to 1), the following applies:

- If cIdx is equal to 0, the following applies: /-1204

- The picture reconstruction with mapping process for luma samples is invoked with the luma location ( xCurr, yCurr ), the block width nCurrSw and height nCurrSh, the predicted luma sample array predSamples, and the residual luma sample array resSamples as inputs, and the output is the reconstructed luma sample array recSamples

- The picture reconstruction with inverse mapping process for luma samples is invoked with the reconstructed luma sample array recSamples as inputs, and the output is the modified reconstructed luma sample array recSamples.

- Otherwise (cIdx is greater than 0), the picture reconstruction with luma dependent chroma residual scaling process for chroma samples is invoked with the chroma location ( xCurr, yCurr ), the transform block width nCurrSw and height nCurrSh, the predicted chroma sample array predSamples, and the residual chroma sample array resSamples as inputs, and the output is the reconstructed chroma sample array recSamples.

FIG. 12

Weighted sample prediction process for combined merge and intra prediction

Inputs to this process are: /1300

- the width of the current coding block cbWidth,
- the height of the current coding block cbHeight,
- two (cbWidth)x(cbHeight) arrays predSamplesInter and predSamplesIntra,
- the intra prediction mode predModeIntra,
- a variable cIdx specifying the colour component index.

Output of this process is the (cbWidth)x(cbHeight) array predSamplesComb of prediction sample values.

The variable bitDepth is derived as follows:

- If cIdx is equal to 0, bitDepth is set equal to BitDepth$_Y$.
- Otherwise, bitDepth is set equal to BitDepth$_C$.

The prediction samples predSamplesComb[ x ][ y ] with x = 0..cbWidth − 1 and y = 0..cbHeight − 1 are derived as follows:

- The weight w is derived as follows.
  - If one or more of the following conditions are true, w is set equal to 4:
    - cbWidth is less than 4.
    - cbHeight is less than 4.
    - predModeIntra is equal to INTRA_PLANAR
    - predModeIntra is equal to INTRA_DC.
  - Otherwise, if predModeIntra is INTRA_ANGULAR50, w is specified in Table 8-11 with nPos equal to y and nSize equal to cbHeight.
  - Otherwise, if predModeIntra is INTRA_ANGULAR18, w is specified in Table 8-11 with nPos equal to x and nSize equal to cbWidth.
  - Otherwise, w is set equal to 4.
- When cIdx is equal to 0 and slice_lmcs_enabled_flag is equal to 1 and cu_lossless_mode_flag is equal to 0, /1302 predSamplesInter is modified as follows: /1303 idxY = predSamplesInter[ x ][ y ] >> Log2( OrgCW )
  predSamplesInter [ x ][ y ] = Clip1$_Y$ ( LmcsPivot[ idxY ] +
                     ( ScaleCoeff[ idxY ] * ( predSamplesInter[ x ][ y ] − InputPivot[ idxY ] ) +
                     ( 1 << 13 ) ) >> 14 )

- The prediction samples predSamplesComb[ x ][ y ] are derived as follows:

predSamplesComb[ x ][ y ] = ( w * predSamplesIntra[ x ][ y ] +
                     ( 8 − w ) * predSamplesInter[ x ][ y ] ) >> 3 )  /1301

Table 8-11 – Specification of w as a function of the position nP and the size nS

| 0 <= nP < ( nS / 4 ) | ( nS / 4 ) <= nP < ( nS / 2 ) | ( nS / 2 ) <= nP < ( 3 *nS / 4 ) | ( 3 *nS / 4 ) <= nP < nS |
|---|---|---|---|
| 6 | 5 | 3 | 2 |

FIG. 13

LOSSLESS CODING MODE AND SWITCHABLE RESIDUAL CODING

INCORPORATION BY REFERENCE

This present application claims the benefit of U.S. Provisional Application No. 62/834,333, "Lossless Coding Mode in VVC" filed Apr. 15, 2019, and No. 62/908,227, "Switchable Residual Coding" filed Sep. 30, 2019. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions.

As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus of video decoding can include circuitry configured to receive a lossless mode flag associated with a current block indicating whether a lossless coding mode is applied to the current block, determine that a lossy coding mode is not applied to the current block when the lossless mode flag indicates that the lossless coding mode is applied to the current block, and reconstruct the current block with the lossy coding mode disabled.

In an embodiment, the circuitry is further configured to receive a syntax element indicating whether the lossless coding mode is allowed for current video data. In an embodiment, it is determined that a syntax element associated with the lossy coding mode is not present. In an example, a syntax element indicating the lossy coding mode is enabled is received.

In an embodiment, the lossy coding mode is one of: a joint chroma residual coding mode, a luma mapping with chroma scaling (LMCS) coding mode, a combined intra and inter prediction (CIIP) coding mode, a quantized residual block-based delta pulse code modulation (BDPCM) coding mode, a multiple transform selection (MTS) coding mode, a secondary transform (ST) coding mode, a dependent quantization coding mode, a transform skip (TS) coding mode, or a sub-block transform (SBT) coding mode. In an embodiment, a syntax element associated with a current video data indicating only a lossless coding mode(s) is allowed for the current video data can be received.

In some embodiments, another apparatus of vide decoding can include circuitry configured to receive a first syntax element indicating one of multiple coefficient coding schemes used for coefficient coding of a current block, determine a residual coding syntax according to the first syntax element, determine syntax elements of the coefficient coding of the current block according to the determined residual coding syntax, and reconstructing the current block based on the determined syntax elements of the coefficient coding of the current block.

In an embodiment, the multiple coefficient coding schemes include one of a first coefficient coding scheme applied for spatial prediction residuals without transform, or a second coefficient coding scheme applicable for transform coefficients. In an embodiment, the spatial prediction residuals are results of a transform skip mode or a residual domain block-based delta pulse code modulation (BDPCM) mode.

In an embodiment, a flag indicating whether transform and quantization processes are bypassed can be received. When the flag indicates the transform and quantization processes are bypassed, the residual coding syntax can be determined according to the first syntax element. When the flag indicates the transform and quantization processes are not bypassed, the first syntax element can be ignored.

In an embodiment, the current block is coded with one of a lossless coding mode, a residual domain BDPCM coding mode, a TS coding mode, an intra prediction coding mode, an intra block copy (IBC) coding mode, a joint Cb Cr residual (JCCR) coding mode, a MTS coding mode, a low-frequency non-separable secondary transform (LFNST) coding mode, a multiple reference line (MRL) intra prediction coding mode, an inter prediction coding mode, a palette coding mode, or a cross-component linear model (CCLM) coding mode. In an embodiment the first syntax element is context coded. A context model for decoding the first syntax element can be determined based on which coding mode is used for the current block.

In an embodiment, the first syntax element is associated with different color components of a coding unit corresponding to the current coding block. In an embodiment, different block-level syntax elements are received each indicating one of the multiple coefficient coding schemes for different color components.

Aspects of the disclosure also provide non-transitory computer-readable media storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 7 shows a block diagram of a decoder in accordance with another embodiment.

FIG. 8A shows a coding tree unit (CTU) that is partitioned with a quadtree plus binary tree (QTBT) structure (820).

FIG. 8B shows the QTBT structure (820).

FIG. 9A shows a horizontal center-side triple-tree.

FIG. 9B shows a vertical center-side triple-tree.

FIG. 12 shows a text (1200) of a specification of a video coding standard that is modified to accommodate implementation of a lossless coding mode.

FIG. 13 shows another text (1300) of a specification of a video coding standard that is modified to accommodate implementation of a lossless coding mode.

DETAILED DESCRIPTION OF EMBODIMENTS

I. Video Coding Encoder and Decoder

Figure 1:
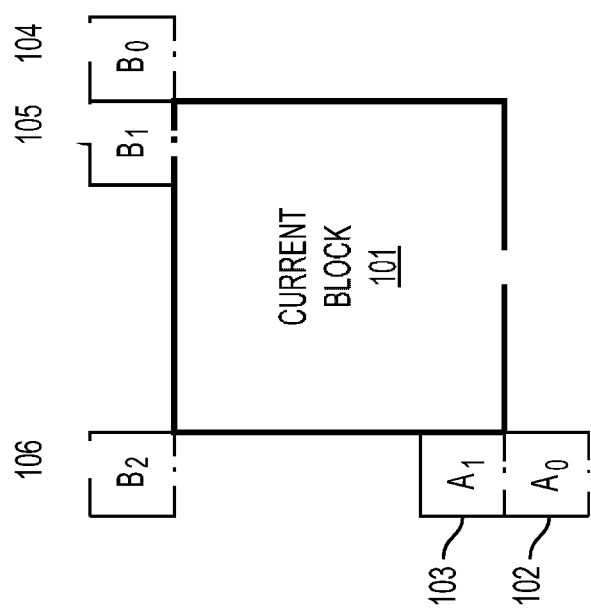
FIG. 1 is a schematic illustration of a current block and its surrounding spatial merge candidates in one example.
Figure 2:
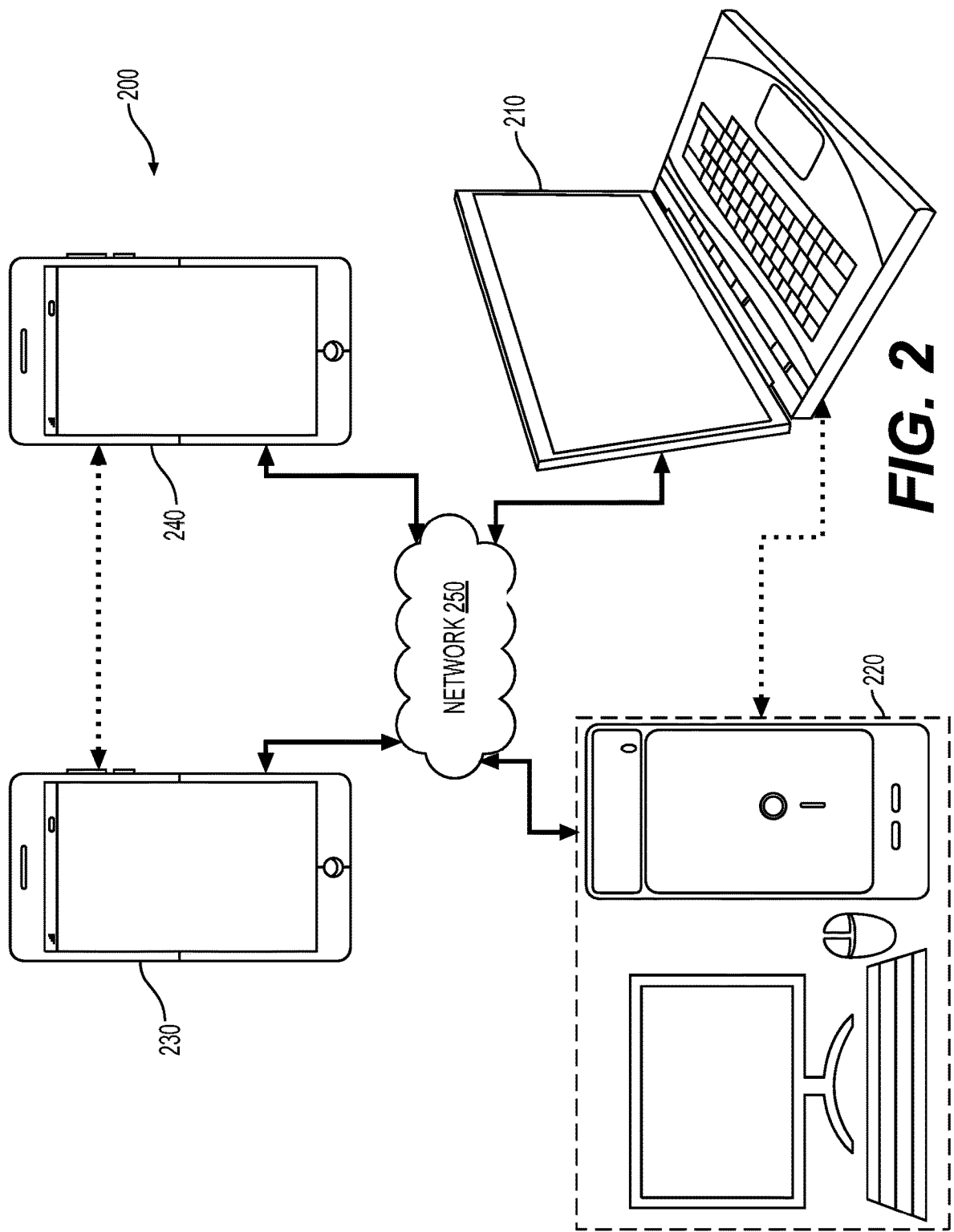
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
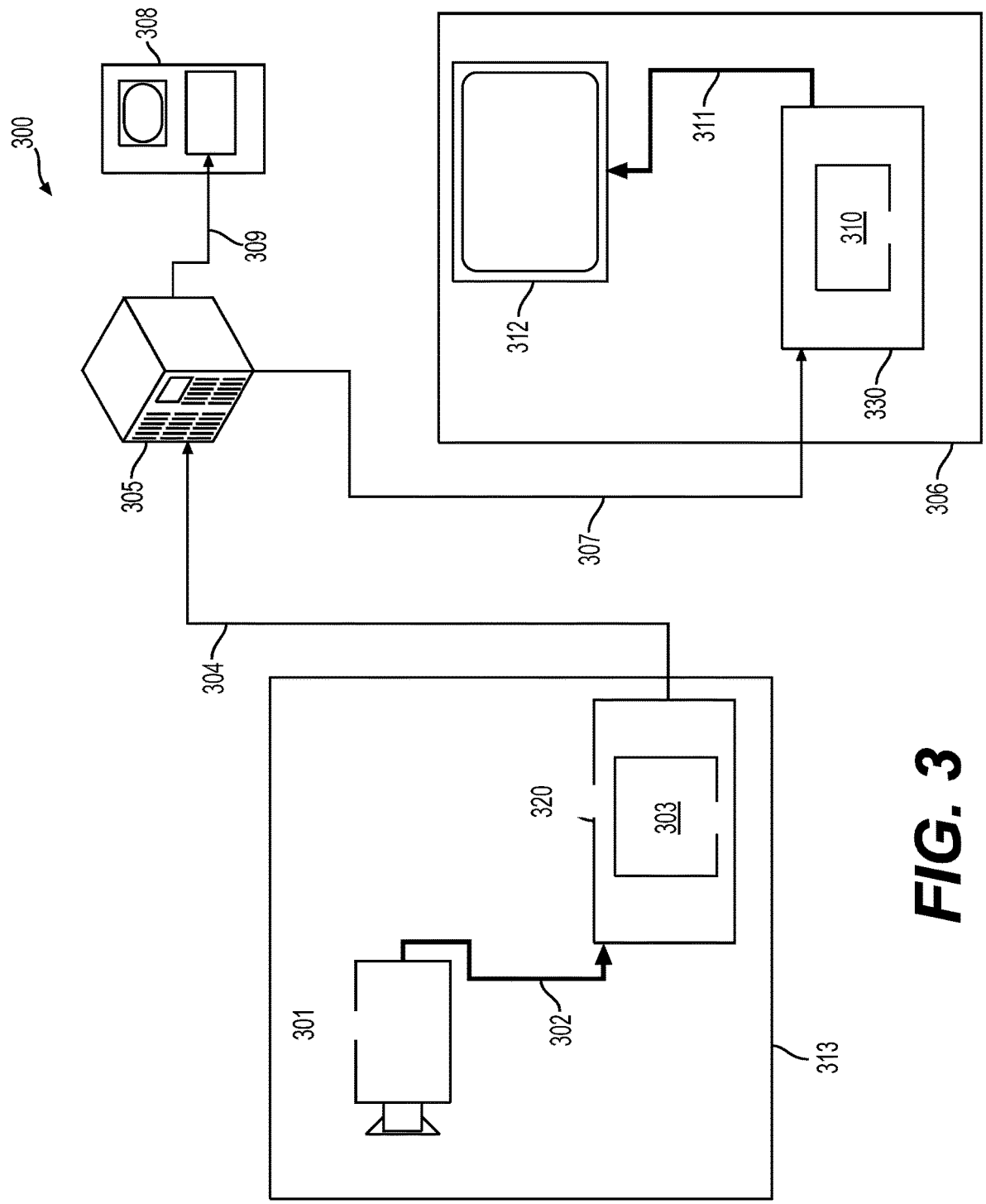
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
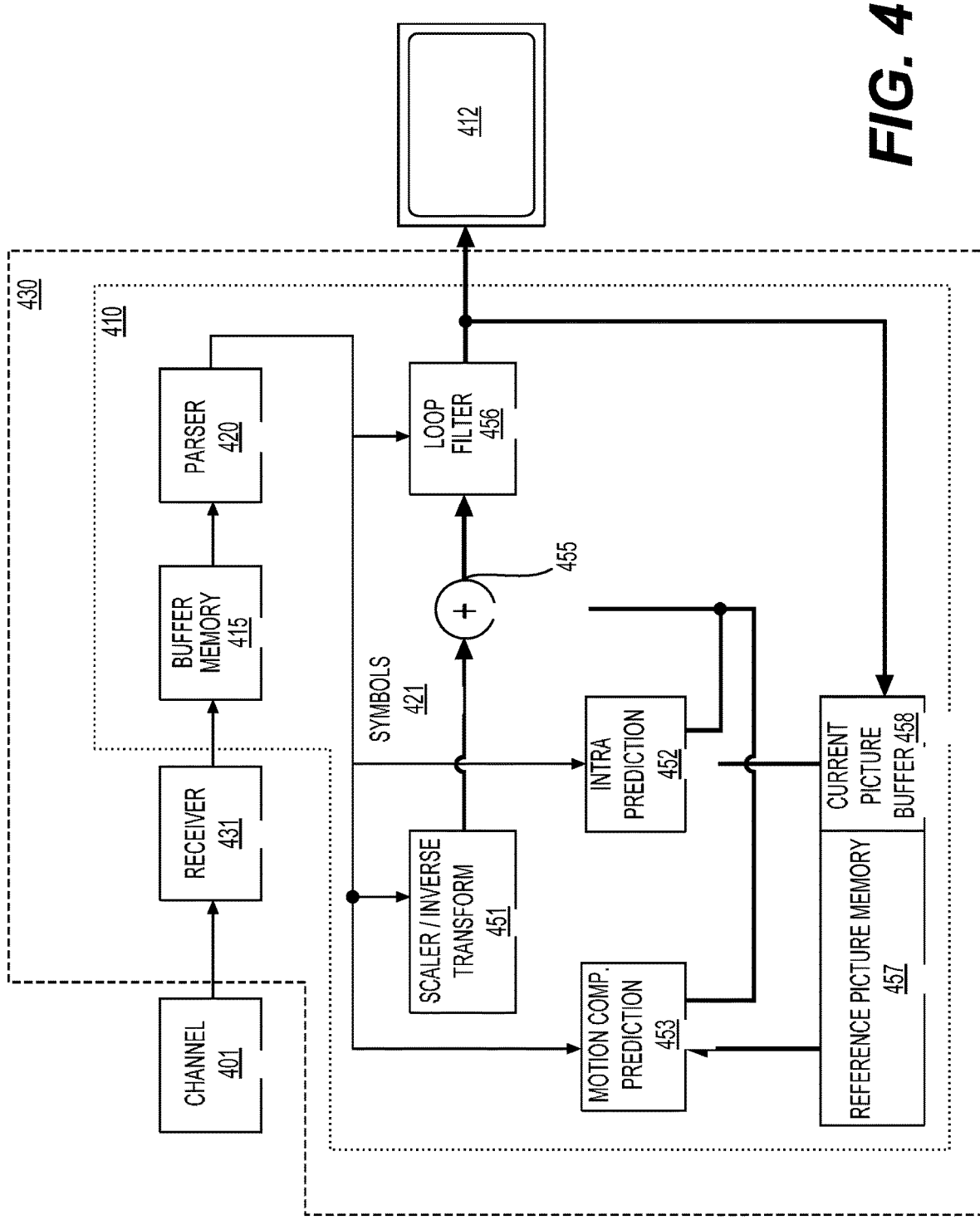
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
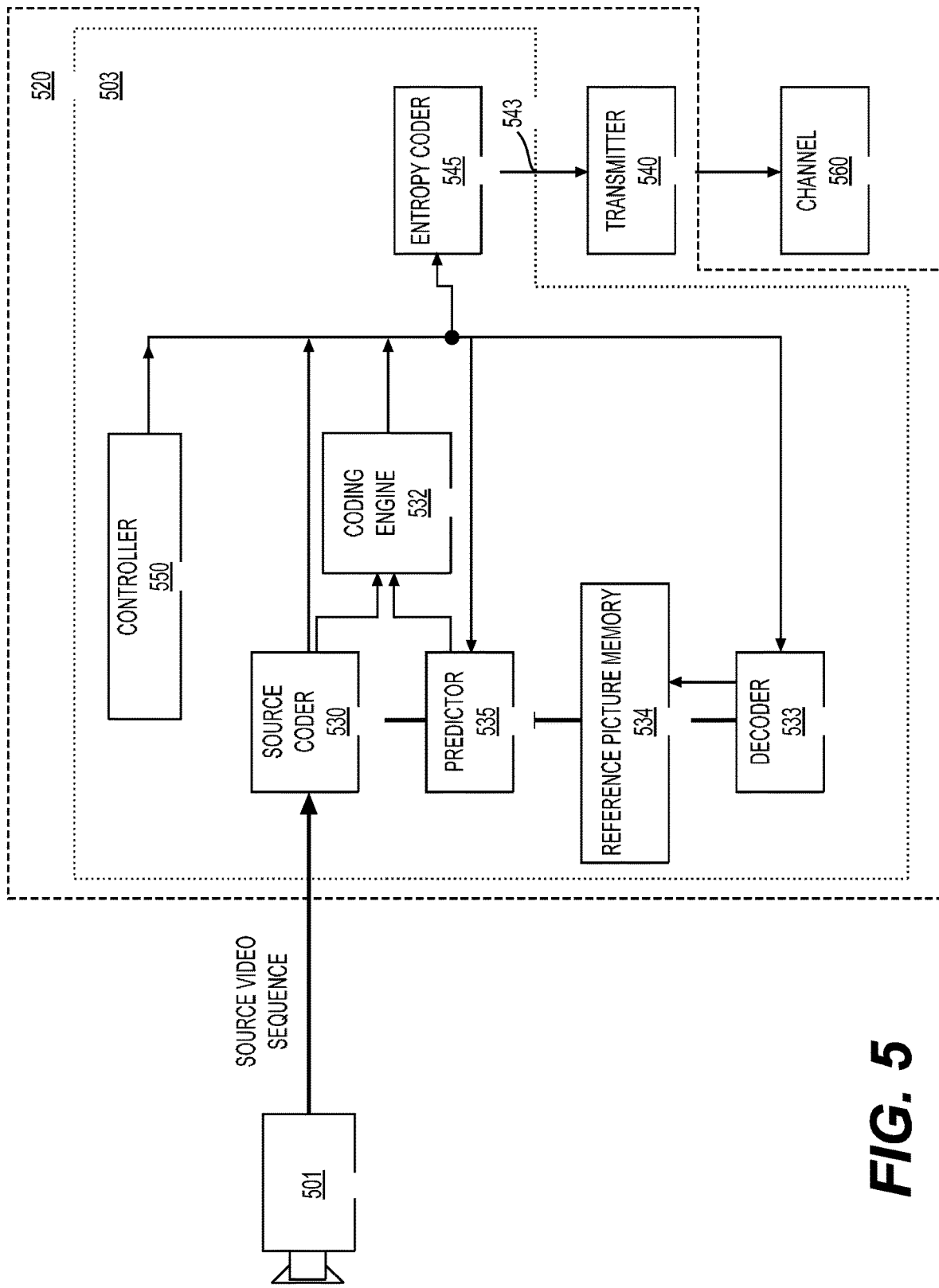
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any color space (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
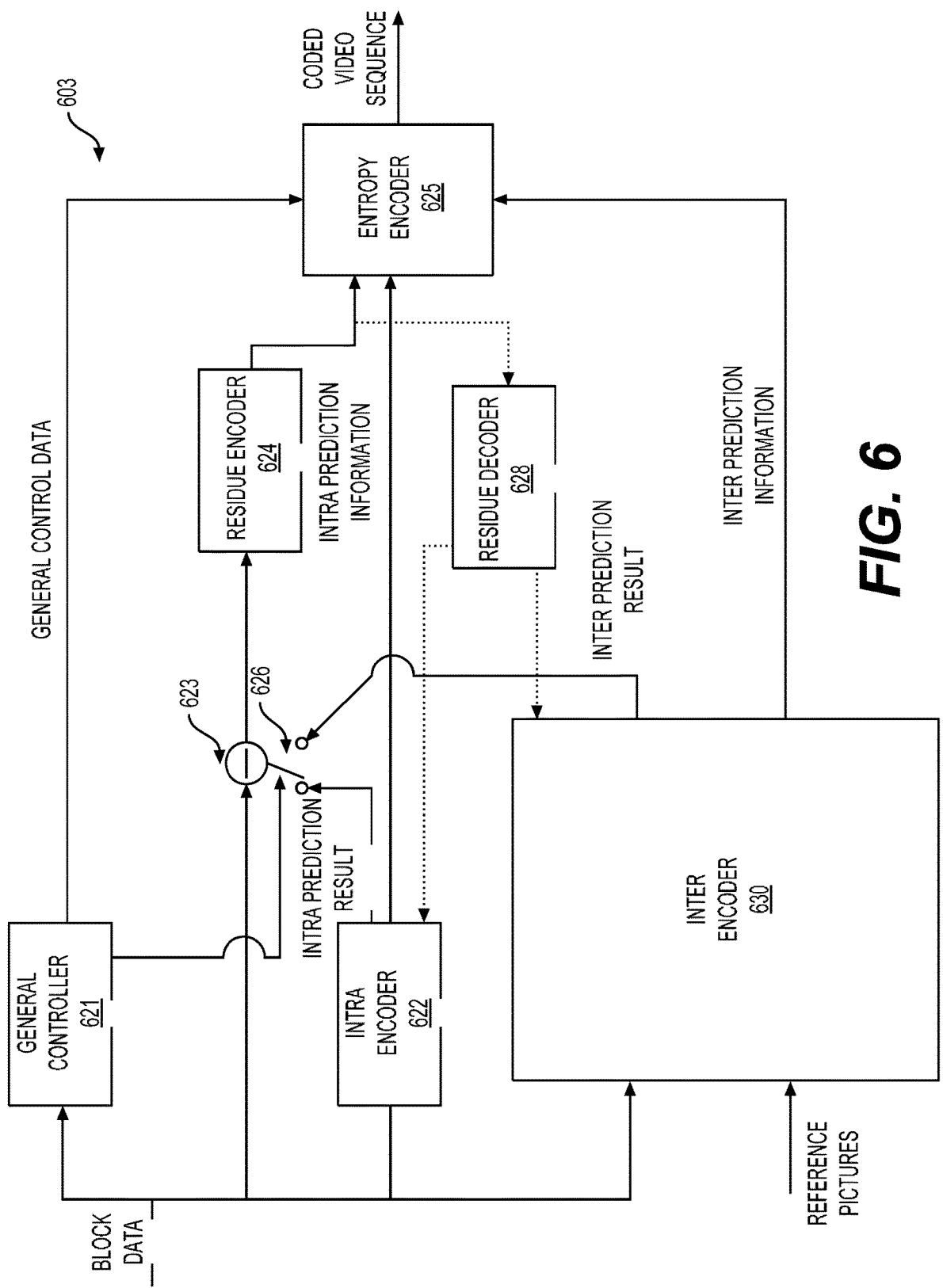
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Block Partition Structure

1. Quadtree Block Partitioning Structure

A block partitioning structure is referred to as a coding tree. In some embodiments, by using a quadtree structure, a coding tree unit (CTU) is split into coding units (CUs) to adapt to various local characteristics. A decision on whether to code a picture area using an inter-picture (temporal) or intra-picture (spatial) prediction is made at CU level. Each CU can be further split into one, two, or four prediction units (PUs) according to a PU splitting type. Inside one PU, a same prediction process is applied and relevant information is transmitted to a decoder on a PU basis.

After obtaining a residual block by applying a prediction process based on the PU splitting type, a CU can be partitioned into transform units (TUs) according to another quadtree structure. As can be seen, there are multiple partition conceptions including CU, PU, and TU. In some embodiments, a CU or a TU can only be square shape, while a PU may be square or rectangular shape. In some embodiments, one coding block may be further split into four square sub-blocks, and transform is performed on each sub-block, i.e., TU. Each TU can be further split recursively into smaller Tus using a quadtree structure which is called residual quadtree (RQT).

At a picture boundary, in some embodiments, implicit quadtree split can be employed so that a block will keep quad-tree splitting until the size fits the picture boundary.

2. Quadtree Plus Binary Tree (QTBT) Block Partitioning Structure

In some embodiments, a quadtree plus binary tree (QTBT) structure is employed. The QTBT structure removes the concepts of multiple partition types (the CU, PU and TU concepts), and supports more flexibility for CU partition shapes. In the QTBT block structure, a CU can have either a square or rectangular shape.

FIG. 8A shows a CTU (810) that is partitioned by using a QTBT structure (820) shown in FIG. 8B. The CTU (810) is first partitioned by a quadtree structure. The quadtree leaf nodes are further partitioned by a binary tree structure or a quadtree structure. There can be two splitting types, symmetric horizontal splitting and symmetric vertical splitting, in the binary tree splitting. The binary tree leaf nodes are called CUs that can be used for prediction and transform processing without any further partitioning. Accordingly, CU, PU and TU have the same block size in the QTBT coding block structure.

In some embodiments, a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

The following parameters are defined for the QTBT partitioning scheme in some embodiments:
- CTU size: the root node size of a quadtree, e.g. the same concept as in HEVC.
- MinQTSize: the minimum allowed quadtree leaf node size.
- MaxBTSize: the maximum allowed binary tree root node size.
- MaxBTDepth: the maximum allowed binary tree depth.
- MinBTSize: the minimum allowed binary tree leaf node size.

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0.

When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In an embodiment, a maximum CTU size is 256×256 luma samples.

In FIGS. 8A and 8B, the solid lines indicate quadtree splitting and dotted lines indicate binary tree splitting. In each splitting (i.e., non-leaf) node of the binary tree, one flag is signaled to indicate which splitting type (i.e., horizontal or vertical) is used. For example, 0 indicates a horizontal splitting and 1 indicates a vertical splitting. For the quadtree splitting, there is no need to indicate the splitting type since quadtree splitting can split a block both horizontally and vertically to produce 4 sub-blocks with an equal size.

In some embodiments, the QTBT scheme supports the flexibility for the luma and chroma to have a separate QTBT structure. For example, for P and B slices, the luma and chroma blocks in one CTU share the same QTBT structure. However, for I slices, the luma CTB is partitioned into CUs by a QTBT structure, and the chroma blocks are partitioned into chroma CUs by another QTBT structure. Thus, a CU in an I slice consists of a coding block of the luma component or coding blocks of two chroma components, and a CU in a P or B slice consists of coding blocks of all three color components.

In some embodiments, inter prediction for small blocks is restricted to reduce memory access of motion compensation. For example, bi-prediction is not supported for 4×8 and 8×4 blocks, and inter prediction is not supported for 4×4 blocks.

3. Ternary Tree (TT) Block Partitioning Structure

In some embodiments, a multi-type-tree (MTT) structure is used for partitioning a picture. The MTT structure is a more flexible tree structure than the QTBT structure. In MTT, in addition to quad-tree and binary-tree, horizontal center-side triple-tree and vertical center-side triple-tree as shown in FIG. 9A and FIG. 9B, respectively, are employed. Triple tree partitioning can complement quad-tree and binary-tree partitioning. For example, triple-tree partitioning is able to capture objects which locate in a block center, while quad-tree and binary-tree splits crossing block centers. The width and height of partitions by triple trees are a power of 2 so that no additional transform partition is needed.

III. Example of a Lossless Coding Mode

To support certain application scenarios where any degradation of video quality is not desired, such as medical imaging where loss of information may result in diagnostic errors, a lossless coding approach can be enabled in some embodiments.

In an embodiment, when a lossless coding mode is activated, transform and quantization can be bypassed, and one or more loop filter such as deblocking filter can also be disabled. A flag, denoted by transquant_bypass_enable_flag, can be signaled in a picture parameter set (PPS). If a decoder receives such a flag and its value is signaled as 1, the decoder may bypass transform, quantization and loop filter processing. As an example, a syntax table (Table 1) of a PPS is shown below which implements the lossless coding mode. A transquant_bypass_enable_flag is shown in row 20 of Table 1.

TABLE 1

| Row number | pic_parameter_set_rbsp( ) { | Descriptor |
|---|---|---|
| 1 | pps_pic_parameter_set_id | ue(v) |
| 2 | pps_seq_parameter_set_id | ue(v) |
| 3 | dependent_slice_segments_enabled_flag | u(1) |
| 4 | sign_data_hiding_flag | u(1) |
| 5 | cabac_init_present_flag | u(1) |
| 6 | num_ref_idx_l0_default_active_minus1 | ue(v) |
| 7 | num_ref_idx_l1_default_active_minus1 | ue(v) |
| 8 | init_qp_minus26 | se(v) |
| 9 | constrained_intra_pred_flag | u(1) |
| 10 | transform_skip_enabled_flag | u(1) |
| 11 | cu_qp_delta_enabled_flag | u(1) |
| 12 | if ( cu_qp_delta_enabled_flag ) | |
| 13 | diff_cu_qp_delta_depth | ue(v) |
| 14 | pps_cb_qp_offset | se(v) |

TABLE 1-continued

| Row number | pic_parameter_set_rbsp( ) { | Descriptor |
|---|---|---|
| 15 | pps_cr_qp_offset | se(v) |
| 16 | pps_slice_chroma_qp_offsets_present_flag | u(1) |
| 17 | weighted_pred_flag | u(1) |
| 18 | weighted_bipred_flag | u(1) |
| 19 | output_flag_present_flag | u(1) |
| 20 * | transquant_bypass_enable_flag | u(1) |
| 21 | tiles_enabled_flag | u(1) |
| 22 | entropy_coding_sync_enabled_flag | u(1) |
| 23 | if( tiles_enabled_flag ) { | |
| 24 |    num_tile_columns_minus1 | ue(v) |
| 25 |    num_tile_rows_minus1 | ue(v) |
| 26 |    uniform_spacing_flag | u(1) |
| 27 |    if( !uniform_spacing_flag ) { | |
| 28 |      for( i = 0; i < num_tile_columns_minus1; i++) | |
| 29 |        column_width_minus1[i] | ue(v) |
| 30 |      for( i = 0; i < num_tile_rows_minus1; i++) | |
| 31 |        row_height_minus1[i] | ue(v) |
| 32 |    } | |
| 33 |    loop_filter_across_tiles_enabled_flag | u(1) |
| 34 | } | |
| 35 | loop_filter_across_slices_enabled_flag | u(1) |
| 36 | deblocking_filter_control_present_flag | u(1) |
| 37 | if( deblocking_filter_control_present_flag ) { | |
| 38 |    deblocking_filter_override_enabled_flag | u(1) |
| 39 |    pps_disable_deblocking_filter_flag | u(1) |
| 40 |    if( !pps_disable_deblocking_filter_flag ) { | |
| 41 |      pps_beta_offset_div2 | se(v) |
| 42 |      pps_tc_offset_div2 | se(v) |
| 43 |    } | |
| 44 | } | |
| 45 | pps_scaling_list_data_present_flag | u(1) |
| 46 | if( pps_scaling_list_data_present_flag ) | |
| 47 |    scaling_list_data( ) | |
| 48 | lists_modification_present_flag | u(1) |
| 49 | log2_parallel_merge_level_minus2 | ue(v) |
| 50 | num_extra_slice_header_bits | u(3) |
| 51 | slice_segment_header_extension_present_flag | u(1) |
| 52 | pps_extension_flag | u(1) |
| 53 | if( pps_extension_flag ) | |
| 54 |    while( more_rbsp_data( ) ) | |
| 55 |      pps_extension_data_flag | u(1) |
| 56 | rbsp_trailing_bits( ) | |
| 57 | } | |

For example, the transquant_bypass_enable_flag equal to 1 specifies that cu_transquant_bypass_flag can be present. The transquant_bypass_enable_flag equal to 0 specifies that cu_transquant_bypass_flag is not present. For each CU, if the transquant_bypass_enable_flag is true, another flag, denoted by cu_transquant_bypass_flag can further be signaled for CUs to indicate whether transform, quantization and loop filter is disabled for current CU. In an example, when the cu_transquant_bypass_flag is signaled as true, a syntax element indicating transform skip mode (TSM) (transform_skip_flag) is not signaled, and a sign data hiding mode is disabled.

In an example, the cu_transquant_bypass_flag equal to 1 specifies that the scaling and transform process and the in-loop filter process are bypassed. When the cu_transquant_bypass_flag is not present, it is inferred to be equal to 0.

IV. Examples of Lossy Coding Modes

1. Joint Chroma Residual Coding Mode

In some embodiments, a joint chroma residual coding mode (also referred to as joint Cb Cr residual (JCCR) coding mode) can be employed. As Cb and Cr residuals appear to correlate inversely with each other, the JCCR mode can take advantage of this phenomenon and enable jointly coding of chrominance residuals. In JCCR mode there is a single residual indicated for two chrominance blocks of a transform unit. The indicated residual is added to the prediction block in the first channel (typically representing Cb) and deducted from the prediction block in the second channel (typically representing Cr).

In an example, a joint chroma residual mode is indicated with a flag in a bitstream if the coded block flags (cbf) for both Cb and Cr are true. If the mode is activated, a single residual block is decoded. The bitstream syntax and decoding process of joint residual blocks can be similar to that of regular Cb residuals in an example. The residuals of the Cr blocks are generated by negating the decoded joint residual. As a single residual is used to represent residuals of two blocks, it may often be desirable for this mode to use a QP lower than what is used for separate coding of chrominance residuals. In an example, a chroma QP offset of −1 was used for the joint mode and +1 was used for separate chroma coding.

Examples of syntax implementing the JCCR mode are described below. Table 2 shows PPS raw byte sequence payload (RBSP) syntax. The syntax element in row 4 of Table 2, pps_joint_cbcr_qp_offset, specifies the offset to the luma quantization parameter Qp'Y used for deriving Qp'CbCr. In an example, the value of pps_joint_cbcr_qp_offset can be in the range of −12 to +12, inclusive. When ChromaArrayType is equal to 0, pps_joint_cbcr_qp_offset is not used in the decoding process and decoders can ignore its value.

TABLE 2

| Row number | pic_parameter_set_rbsp( ) { | Descriptor |
|---|---|---|
| 1 | ... | |
| 2 |    pps_cb_qp_offset | se(v) |
| 3 |    pps_cr_qp_offset | se(v) |
| 4 * |    pps_joint_cbcr_qp_offset | se(v) |
| 5 | ... | |
| 6 | } | |

Table 3 shows general tile group header syntax. The syntax element in row 5 of Table 3, tile_group_joint_cbcr_qp_offset, specifies a difference to be added to the value of pps_joint_cbcr_qp_offset when determining the value of the Qp'CbCr quantization parameter. In an example, the value of tile_group_joint_cbcr_qp_offset can be in the range of −12 to +12, inclusive. When tile_group_joint_cbcr_qp_offset is not present, it is inferred to be equal to 0. The value of pps_joint_cbcr_qp_offset+tile_group_joint_cbcr_qp_offset shall be in the range of −12 to +12, inclusive.

TABLE 3

| Row number | tile_group_header( ) { | Descriptor |
|---|---|---|
| 1 | ... | |
| 2 |    if( pps_tile_group_chroma_qp_offsets_present_flag ) { | |
| 3 |      tile_group_cb_qp_offset | se(v) |
| 4 |      tile_group_cr_qp_offset | se(v) |
| 5 * |      tile_group_joint_cbcr_qp_offset | se(v) |
| 6 |    } | |
| 7 | ... | |
| 8 | } | |

Table 4 shows residual coding syntax. The syntax element in row 2 of Table 4, tu_joint_cbcr_residual[x0][y0], specifies whether indicated Cb residual is used to derive both Cb and Cr residuals. The array indices x0, y0 specify the location (x0, y0) of the top-left luma sample of the considered transform block relative to the top-left luma sample of the picture. In an example, the tu_joint_cbcr_residual[x0][y0] equal to 1 specifies that the indicated Cb residual is used to derive the Cr residual. The tu_joint_cbcr_residual[x0][y0] equal to 0 specifies that Cr residual may be present in the bitstream depending on other syntax elements. When tu_joint_cbcr_residual[x0][y0] is not present, it is inferred to be equal to 0.

TABLE 4

| Row number | residual_coding( x0, y0, log2TbWidth, log2TbHeight, cIdx ) { | Descriptor |
|---|---|---|
| 1 * | if( cIdx == 2 && tu_cbf_cb[ x0 ][ y0 ] ) { | |
| 2 * | tu_joint_cbcr_residual[ x0 ][ y0 ] | ae(v) |
| 3 * | if( tu_joint_cbcr_residual [ x0 ][ y0 ] ) { | |
| 4 * | return | |
| 5 | } | |
| 6 | ... | |
| 7 | } | |

In an example of a joint chroma residual coding process, a derivation process for quantization parameters can be performed as follows. The variables qPCb, qPCr and qPCbCr can be derived as according to:

$qPiCb=\text{Clip3}(-QpBd\text{Offset}C,69,QpY+pps\_cb\_qp\_\text{off-set}+tile\_group\_cb\_qp\_\text{offset})$ $qPiCr=\text{Clip3}(-QpBd\text{Offset}C,69,QpY+pps\_cr\_qp\_\text{off-set}+tile\_group\_cr\_qp\_\text{offset})$ $qPiCbCr=\text{Clip3}(-QpBd\text{Offset}C,69,QpY+pps\_joint\_cbcr\_qp\_\text{offset}+tile\_group\_joint\_cbcr\_qp\_\text{offset})$ If ChromaArrayType is equal to 1, the variables qPCb, qPCr and qPCbCr are set equal to the value of QpC as specified in Table 8-12 based on the index qPi equal to qPiCb, qPiCr and qPCbCr, respectively. Otherwise, the variables qPCb, qPCr and qPCbCr are set equal to Min(qPi, 63), based on the index qPi equal to qPiCb, qPiCr and qPCbCr, respectively. The chroma quantization parameters for the Cb and Cr components, Qp'Cb and Qp'Cr, and joint Cb-Cr coding Qp'CbCr, are derived as follows:

$Qp'Cb=qPCb+QpBd\text{Offset}C$ $Qp'Cr=qPCr+QpBd\text{Offset}C$ $Qp'CbCr=qPCbCr+QpBd\text{Offset}C$ In the example joint chroma residual coding process, for scaling and transformation, the (nTbW)x(nTbH) array of residual samples resSamples can be derived as follows: If cIdx is equal to 2 and tu_joint_cbcr_residual[xTbY][yTbY] is equal to 1, the residual samples resSamples[x][y] with x=0 . . . nTbW−1, y=0 . . . nTbH−1 are derived as follows:

$resSamples[x][y]=-resSamplesCb[x][y]$ where resSamplesCb[x][y] is the residual sample array generated for a chrominance block with the transform block location (xTbY, yTbY) and cIdx equal to 1.

In the example joint chroma residual coding process, for transform coefficients scaling, the quantization parameter qP is derived as follows: If cIdx is equal to 0, the following applies:

$qP=Qp'Y$

Otherwise, if cIdx is equal to 1 and tu_joint_cbcr_residual[xTbY][yTbY] is equal to 1, the following applies:

$qP=Qp'CbCr$

2. Luma Mapping with Chroma Scaling (LMCS)

In some embodiments, a coding tool called the luma mapping with chroma scaling (LMCS) is added as a processing block before loop filters. LMCS can have two main components: 1) in-loop mapping of the luma component based on adaptive piecewise linear models; 2) for the chroma components, luma-dependent chroma residual scaling is applied.

Figure 10:
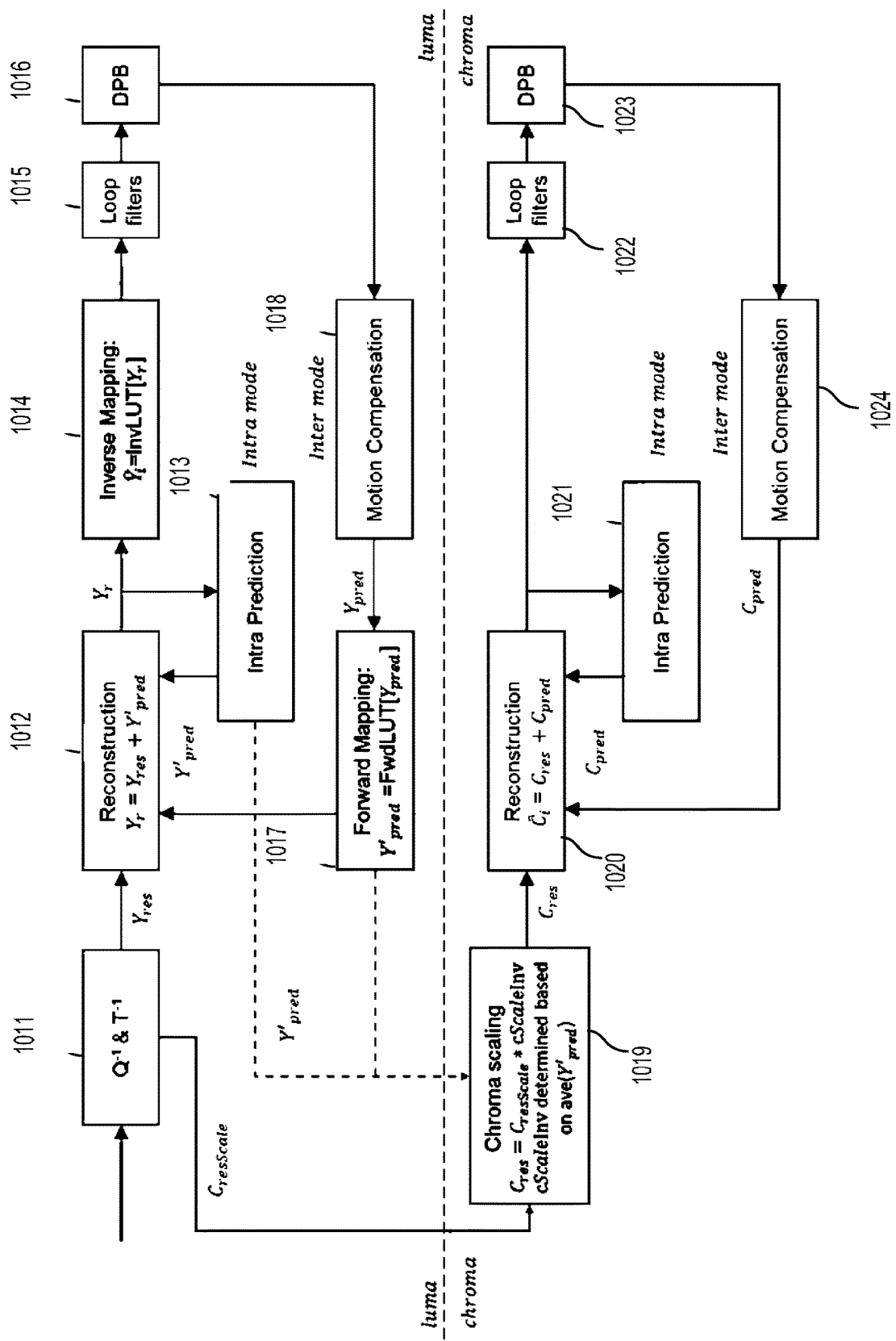
FIG. 10 shows a luma mapping and chroma scaling (LMCS) architecture from decoder's perspective.

FIG. 10 shows an LMCS architecture from decoder's perspective. The blocks (1011, 1012, 1013) in FIG. 10 indicate where the processing is applied in the mapped domain. The processing includes the inverse quantization and inverse transform (1011), luma intra prediction (1013) and adding of the luma prediction together with the luma residual (1012). The blocks (1015, 1016, 1018, 1020-1024) in FIG. 10 indicate where the processing is applied in the original (i.e., non-mapped) domain. The processing includes loop filters (1015, or 1022) such as deblocking, ALF, and SAO, motion compensated prediction (1018 or 1024), chroma intra prediction (1021), adding of the chroma prediction together with the chroma residual (1020), and storage of decoded pictures as reference pictures in decoded picture buffers (DPBs) (1016 or 1023). The blocks (1014, 1017, and 1019) in FIG. 10 are the LMCS functional blocks, including forward and inverse mapping of the luma signal (1014 and 1017) and a luma-dependent chroma scaling process (1019). In an example, LMCS can be enabled/disabled at the sequence level using a sequence parameter set (SPS) flag.

2.1 Examples of Luma Mapping with Piecewise Linear Model

The in-loop mapping of the luma component adjusts the dynamic range of the input signal by redistributing the codewords across the dynamic range to improve compression efficiency. Luma mapping makes use of a forward mapping function, FwdMap, and a corresponding inverse mapping function, InvMap. The FwdMap function is signaled using a piecewise linear model with 16 equal pieces. InvMap function does not need to be signaled and is instead derived from the FwdMap function.

The luma mapping model is signaled at the tile group level. A presence flag is signaled first. If luma mapping model is present in the current tile group, corresponding piecewise linear model parameters are signaled. The piecewise linear model partitions the input signal's dynamic range into 16 equal pieces, and for each piece, linear mapping parameters of the piecewise linear model are expressed using the number of codewords assigned to that piece. Take 10-bit input as an example. Each of the 16 pieces will have 64 codewords assigned to it by default. The signaled number of codewords is used to calculate the scaling factor and adjust the mapping function accordingly for that piece. At the tile group level, another LMCS enable flag is signaled to indicate if the LMCS process as depicted in FIG. 10 is applied to the current tile group.

Each i-th piece, i=0 . . . 15, of the FwdMap piecewise linear model is defined by two input pivot points InputPivot[] and two output (mapped) pivot points MappedPivot[].

The InputPivot[] and MappedPivot[] are computed as follows (assuming 10-bit video):
(1) OrgCW=64
(2) For i=0:16, InputPivot[i]=i*OrgCW (3) For i=0:16, MappedPivot[i] is calculated as follows:
MappedPivot[0]=0;
for(i=0; i<16; i++)

MappedPivot[i+1]=MappedPivot[i]+SignaledCW[i]

where SignaledCW[i] is the signaled number of codewords for the i-th piece.

As shown in FIG. 10, for an inter-coded block, motion compensated prediction is performed in the mapped domain. In other words, after the motion-compensated prediction block $Y_{pred}$ is calculated based on the reference signals in the DPB, the FwdiMap function is applied to map the luma prediction block in the original domain to the mapped domain, $Y'_{pred}$=FwdMap($Y_{pred}$). For an intra-coded block, the FwdMap function is not applied because intra prediction is performed in the mapped domain. After reconstructed block $Y_r$ is calculated, the InvMap function is applied to convert the reconstructed luma values in the mapped domain back to the reconstructed luma values in the original domain ($\hat{Y}_i$=InvMap($Y_r$)). The InvMap function is applied to both intra- and inter-coded luma blocks.

The luma mapping process (forward and/or inverse mapping) can be implemented using either look-up-tables (LUT) or using on-the-fly computation. If LUT is used, then FwdMapLUT and InvMapLUT can be pre-calculated and pre-stored for use at the tile group level, and forward and inverse mapping can be simply implemented as FwdMap ($Y_{pred}$)=FwdMapLUT[$Y_{pred}$] and InvMap($Y_r$)=InvMapLUT [$Y_r$], respectively. Alternatively, on-the-fly computation may be used. Take forward mapping function FwdMap as an example. In order to figure out the piece to which a luma sample belongs, the sample value is right shifted by 6 bits (which corresponds to 16 equal pieces). Then, the linear model parameters for that piece are retrieved and applied on-the-fly to compute the mapped luma value. Let i be the piece index, a1, a2 be InputPivot[i] and InputPivot[i+1], respectively, and b1, b2 be MappedPivot[i] and MappedPivot[i+1], respectively. The FwdMap function is evaluated as follows:

FwdMap($Y_{pred}$)=((b2−b1)/(a2−a1))*($Y_{pred}$−a1)+b1

The InvMap function can be computed on-the-fly in a similar manner, except that conditional checks need to be applied instead of a simple right bit-shift when figuring out the piece to which the sample value belongs, because the pieces in the mapped domain are not equal sized.

2.2 Examples of Luma-Dependent Chroma Residual Scaling

Chroma residual scaling is designed to compensate for the interaction between the luma signal and its corresponding chroma signals. Whether chroma residual scaling is enabled or not is also signaled at the tile group level. If luma mapping is enabled and if dual tree partition (also known as separate chroma tree) is not applied to the current tile group, an additional flag is signaled to indicate if luma-dependent chroma residual scaling is enabled or not. When luma mapping is not used, or when dual tree partition is used in the current tile group, luma-dependent chroma residual scaling is disabled. Further, luma-dependent chroma residual scaling can be disabled for the chroma blocks whose area is less than or equal to 4.

Chroma residual scaling depends on the average value of the corresponding luma prediction block (for both intra- and inter-coded blocks). Denote avgY' as the average of the luma prediction block. The value of $C_{scaleInv}$ is computed in the following steps:

(1) Find the index $Y_{Idx}$ of the piecewise linear model to which avgY' belongs based on the InvMap function.
(2) $C_{ScaleInv}$=cScaleInv[$Y_{Idx}$], where cScaleInv[] is a pre-computed 16-piece LUT.

If the current block is coded as intra, combined inter and intra prediction (CIIP), or intra block copy (IBC, a.k.a. current picture referencing or CPR) modes, avgY' is computed as the average of the intra-, CIIP-, or IBC-predicted luma values; otherwise, avgY' is computed as the average of the forward mapped inter predicted luma values ($Y'_{pred}$ in FIG. 10). Unlike luma mapping, which is performed on the sample basis, $C_{scaleInv}$ is a constant value for the chroma block. With $C_{scaleInv}$, chroma residual scaling is applied as follows:

Encoder side: $C_{ResScale}=C_{Res}*C_{Scale}=C_{Res}/C_{ScaleInv}$

Decoder side: $C_{Res}=C_{ResScale}/$
$C_{Scale}=C_{ResScale}*C_{ScaleInv}$

3. Quantized Residual Block-Based Delta Pulse Code Modulation (BDPCM)

In some embodiments, BDPCM is employed that uses reconstructed samples to predict the rows or columns line by line. For example, the signaled BDPCM direction indicates whether vertical or horizontal prediction is used. The reference pixels used are unfiltered samples. The prediction error is quantized in the spatial domain. Pixels are reconstructed by adding the dequantized prediction error to the prediction.

As an alternative scheme to BDPCM, quantized residual domain BDPCM is used in some embodiments. The signaling and prediction directions used can be identical to BDPCM scheme. The intra prediction is done on the block by sample copying in prediction direction (horizontal or vertical prediction) similar to intra prediction. The residual is quantized and the delta between the quantized residual and its predictor (horizontal or vertical) quantized value is coded. This can be described as follows.

For a block of size M (rows)×N (cols), let $r_{i,j}$, 0≤i≤M−1, 0≤j≤N−1 be the prediction residual after performing intra prediction horizontally (copying left neighbor pixel value across the predicted block line by line) or vertically (copying top neighbor line to each line in the predicted block) using unfiltered samples from above or left block boundary samples. Let Q($r_{i,j}$), 0≤i≤M−1, 0≤j≤N−1 denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$.

When vertical BDPCM is signaled:

$$\tilde{r}_{i,j} = \begin{cases} Q(r_{i,j}), & i=0, 0 \le j \le (N-1) \\ Q(r_{i,j}) - Q(r_{(i-1),j}), & 1 \le i \le (M-1), 0 \le j \le (N-1) \end{cases}.$$

For horizontal prediction, similar rules apply, and the residual quantized samples are obtained by $$\tilde{r}_{i,j} = \begin{cases} Q(r_{i,j}), & 0 \le i \le (M-1), j=0 \\ Q(r_{i,j}) - Q(r_{i,(j-1)}), & 0 \le i \le (M-1), 1 \le j \le (N-1) \end{cases}.$$

The residual quantized samples $\tilde{r}_{i,j}$ are sent to the decoder.

On the decoder side, the above calculations are reversed to produce Q($r_{i,j}$), 0≤i≤M−1, 0≤j≤N−1. For vertical prediction case, Q($r_{i,j}$)=$\Sigma_{k=0}^{i}\tilde{r}_{k,j}$, 0≤i≤(M−1), 0≤j≤(N−1).

For horizontal case, $$Q(r_{i,j}) = \Sigma_{k=0}^{j} \tilde{r}_{i,k}, \ 0 \leq i \leq (M-1), \ 0 \leq j \leq (N-1).$$

The inverse quantized residuals, $Q^{-1}(Q(r_{i,j}))$, are added to the intra block prediction values to produce the reconstructed sample values.

V. Residual Coding Schemes

A block of samples can be entropy coded in spatial domain (e.g., when transform is skipped) or in transform domain. Accordingly, different entropy coding schemes can be selected for entropy coding transform coefficients and coefficients without transform to improve coding efficiency.

1. Entropy Coding Scheme for Transform Coefficients

Figure 11:
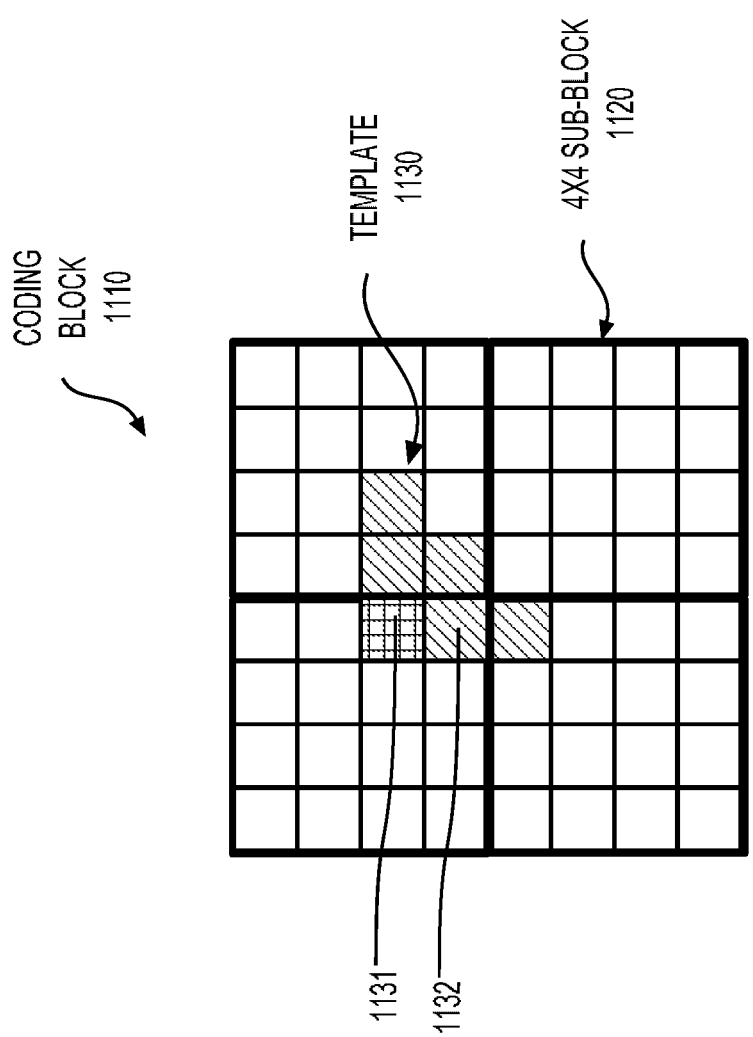
FIG. 11 shows a coding block (1110) split into 4×4 sub-blocks (1120).

In some embodiments, entropy coding for transform coefficients is employed. For example, as shown in FIG. 11, a coding block (1110) is firstly split into 4×4 sub-blocks (1120) and the sub-blocks (1120) inside the coding block (1110) and the transform coefficients within a sub-block are coded according to predefined scan orders. For the sub-block with at least one non-zero transform coefficient, the coding of transform coefficients is separated into four scan passes. Suppose absLevel is the absolute value of the current transform coefficient, in the first pass, the syntax elements sig_coeff_flag (which indicates absLevel is larger than 0), par_level_flag (which indicates the parity of absLevel) and rem_abs_gt1_flag (which indicates (absLevel−1)>>1 is greater than 0) are coded; in the second pass, the syntax element rem_abs_gt2_flag (which indicates absLevel is greater than 4) is coded; in the third pass, the remaining values (referred as abs_remainder) of coefficient levels are invoked, if necessary; in the fourth pass, the sign information is coded.

To exploit the correlation between transform coefficients, the previously coded coefficients covered by a local template (1130) shown in FIG. 11 are used in the context selection for the current coefficients. The local template (1130) can include a current transform coefficient (1131) and five neighboring coefficients (1132). Let absLevel1[x][y] represents the partially reconstructed absolute levels for coefficient at position (x, y) after the first pass, d represents the diagonal position of the current coefficient (d=x+y), numSig represents the number of non-zero coefficients in local template and sumAbs1 represents the sum of partially reconstructed absolute level absLevel1[x] [y] for coefficients covered by local template.

When coding sig_coeff_flag of the current coefficient, the context model index is selected depending on sumAbs1 and diagonal position d. More specifically, for Luma component, the context model index is determined according to:

$$ctxSig=18*max(0,state-1)+min(sumAbs1,5)+ \\ (d<2?12:(d<5?6:0)),$$

which is equivalent to the follows:

$$ctxIdBase=18*max(0,state-1)+(d<2?12:(d<5?6:0))$$

$$ctxSig=ctxIdSigTable[min(sumAbs1,5)]+ctxIdBase$$

For Chroma, the context model index is determined according to:

$$ctxSig=12*max(0,state-1)+min(sumAbs1,5)+(d<2?6:0),$$

which is equivalent to the follows:

$$ctxIdBase=12*max(0,state-1)+(d<2?6:0)$$

$$ctxSig=ctxIdSigTable[min(sumAbs1,5)]+ctxIdBase$$

where state specifies the scalar quantizer used if the dependent quantization is enabled and state is derived using a state transition process; the table ctxIdSigTable stores the context model index offset, ctxIdSigTable[0~5]={0, 1, 2, 3, 4, 5}.

When coding par_level_flag of the current coefficient, the context model index is selected depending on sumAbs1, numSig and diagonal position d. More specifically, for Luma component, the context model index is determined according to:

$$ctxPar=1+min(sumAbs1-numSig,4)+(d==0?15: \\ (d<3?10:(d<10?5:0))),$$

which is equivalent to the follows:

$$ctxIdBase=(d==0?15:(d<3?10:(d<10?5:0)))$$

$$ctxPar=1+ctxIdTable[min(sumAbs1-numSig,4)]+ \\ ctxIdBase$$

For Chroma, the context model index is determined according to:

$$ctxPar=1+min(sumAbs1-numSig,4)+(d==0?5:0),$$

which is equivalent to the follows:

$$ctxIdBase=(d==0?5:0)$$

$$ctxPar=1+ctxIdTable[min(sumAbs1-numSig,4)]+ \\ ctxIdBase$$

where the table ctxIdTable stores the context model index offset, ctxIdTable[0~4]={0, 1, 2, 3, 4}.

When coding rem_abs_gt1_flag and rem_abs_gt2_flag of the current coefficient, their context model index is determined in the same way as par_level_flag:

$$ctxGt1=ctxPar \text{ and } ctxGt2=ctxPar$$

Different sets of context models are used for rem_abs_gt1_flag and rem_abs_gt2_flag. This means that the context model used for rem_abs_gt1_flag is different from that of rem_abs_gt2_flag, even though ctxGt1 is equal to ctxGt2.

2. Entropy Coding for Residuals of Transform Skip Mode (TSM) and Block Based Residual DPCM Mode (Residual Domain BDPCM)

In some embodiments, in order to adapt the residual coding to the statistics and signal characteristics of the transform skip and BDPCM residual levels, which represent the quantized prediction residual (spatial domain), the residual coding scheme for transform coefficients described above is modified and applied for TSM and BDPCM modes as described below.

Three coding passes: In the first coding pass, sig_coeff_flag, coeff_sign_flag, abs_level_gt1_flag, par_level_flag are coded first in one pass. In the second pass, abs_level_gtX_flag are coded, where X can be 3, 5, 7, . . . In the third pass, the remainder of the coefficient levels are coded. The coding pass is operated at the coefficient group (CG) level, that is, for each CG, three coding passes are performed.

No last significant scanning position: Since the residual signal reflects the spatial residual after the prediction and no energy compaction by transform is performed for TS, the higher probability for trailing zeros or insignificant levels at the bottom right corner of the transform block is not given anymore. Thus, last significant scanning position signaling is omitted in this case. Instead, the first sub-block to be processed is the most bottom right sub-block within the transform block.

Sub-block coded block flags (CBFs): For the absence of the last significant scanning position signaling, the sub-block CBF signaling with coded_sub_block_flag for TS can be modified as follows:

(1) Due to quantization, the aforementioned sequence of insignificance may still occur locally inside a transform block. Thus, the last significant scanning position is removed as described before and coded_sub_block_flag is coded for all sub-blocks.

(2) The coded_sub_block_flag for the sub-block covering the DC frequency position (top-left sub-block) presents a special case. In an example, the coded_sub_block_flag for this sub-block is not signaled and always inferred to be equal to 1. When the last significant scanning position is located in another sub-block, it means that there is at least one significant level outside the DC sub-block. Consequently, the DC sub-block may contain only zero/non-significant levels although the coded_sub_block_flag for this sub-block is inferred to be equal to 1. With the absence of the last scanning position information in TS, the coded_sub_block_ flag for each sub-block is signaled. This also includes the coded_sub_block_flag for the DC sub-block except when all other coded_sub_block_flag syntax elements are already equal to 0. In this case, the DC coded_sub_block_flag is inferred to be equal to 1 (inferDcSbCbf=1). Since there has to be at least one significant level in this DC sub-block, the sig_coeff_flag syntax element for the first position at (0,0) is not signaled and derived to be equal to 1 (inferSbDcSigCoeffFlag=1) instead if all other sig_coeff_flag syntax elements in this DC sub-block are equal to 0.

(3) The context modeling for coded_sub_block_flag is changed. The context model index is calculated as the sum of the coded_sub_block_flag to the right and the coded_sub_ block_flag below the current sub-block instead of and a logical disjunction of both.

sig_coeff_flag context modelling: The local template in sig_coeff_flag context modeling is modified to only include the neighbor to the right ($NB_0$) and the neighbor below ($NB_1$) the current scanning position. The context model offset is just the number of significant neighboring positions sig_coeff_flag[$NB_0$]+sig_coeff_flag[$NB_1$]. Hence, the selection of different context sets depending on the diagonal d within the current transform block is removed. This results in three context models and a single context model set for coding the sig_coeff_flag flag.

abs_level_gt1_flag and par_level_flag context modelling: a single context model is employed for abs_level_gt1_flag and par_level_flag.

abs_remainder coding: Although the empirical distribution of the transform skip residual absolute levels typically still fits a Laplacian or a Geometrical distribution, there exist larger instationarities than for transform coefficient absolute levels. Particularly, the variance within a window of consecutive realization is higher for the residual absolute levels. This motivates the following modifications of the abs_remainder syntax binarization and context modelling:

(1) Using a higher cutoff value in the binarization, i.e., the transition point from the coding with sig_coeff_flag, abs_level_gt1_flag, par_level_flag, and abs_level_gt3_flag to the Rice codes for abs_remainder, and dedicated context models for each bin position yields higher compression efficiency. Increasing the cutoff will result in more "greater than X" flags, e.g. introducing abs_level_gt5_flag, abs_level_gt7_flag, and so on until a cutoff is reached. The cutoff itself is fixed to 5 (numGtFlags=5).

(2) The template for the rice parameter derivation is modified, i.e., only the neighbor to the left and the neighbor below the current scanning position are considered similar to the local template for sig_coeff_flag context modeling.

coeff_sign_flag context modelling: Due to the instationarities inside the sequence of signs and the fact that the prediction residual is often biased, the signs can be coded using context models, even when the global empirical distribution is almost uniformly distributed. A single dedicated context model is used for the coding of the signs and the sign is parsed after sig_coeff_flag to keep all context coded bins together.

Restriction of context coded bins: The total number of context coded bins per TU is restricted to be the TU area size multiplied by 2, e.g., the maximum number of context coded bins for a 16×8 TU is 16×8×2=256. The budget of context coded bins is consumed at the TU-level, that is, instead of the individual budget of context coded bins per CG, all the CGs inside the current TU share one budget of context coded bins.

As an example, a transform skip residual coding syntax is shown in Table 5.

TABLE 5

| residual_ts_coding( x0, y0, log2TbWidth, log2TbHeight, cIdx ) { | Descriptor |
|---|---|
|   log2SbSize = ( Min( log2TbWidth, log2TbHeight ) <2 ? 1 : 2) | |
|   numSbCoeff = 1 << ( log2SbSize << 1) | |
|   lastSubBlock = ( 1 << ( log2TbWidth + log2TbHeight − 2 * log2SbSize) ) − 1 | |
|   /* Loop over subblocks from last to the top-left (DC) subblock */ | |
|   inferDcSbCbf = 1 | |
|   for( i = lastSubBlock; i >= 0; i− −) { | |
|     xS = DiagScanOrder[ log2TbWidth − log2SbSize ][ log2TbHeight − log2SbSize ][ lastSubBlock][0] | |
|     yS = DiagScanOrder[ log2TbWidth − log2SbSize ][ log2TbHeight − log2SbSize ][ lastSubBlock][1] | |
|     if( ( i > 0 \|\| !inferDcSbCbf ) | |
|       coded_sub_block_flag[ xS ][ yS ] | ae(v) |
|     if( coded_sub_block_flag[ xS ][ yS ] && i > 0) | |
|       inferDcSbCbf = 0 | |
|   } | |
|   /* First scan pass */ | |
|   inferSbDcSigCoeffFlag = 1 | |
|   for( n = ( i = = numSbCoeff − 1; n >= 0; n− −) { | |
|     xC = ( xS << log2SbSize ) + DiagScanOrder[ log2SbSize ][ log2SbSize ] | |

TABLE 5-continued

```
residual_ts_coding( x0, y0, log2TbWidth, log2TbHeight, cIdx ) {                    Descriptor

[ n ][ 0 ]
        yC = ( yS << log2SbSize ) + DiagScanOrder[ log2SbSize ][ log2SbSize ]
            [ n ][ 1 ]
        if( coded_sub_block_flag[ xS ][ yS ] && ( n > 0 | | !inferSbDcSigCoeffFlag
        ) ) {
          sig_coeff_flag[ xC ][ yC ]                                                 ae(v)
          if( sig_coeff_flag[ xC ][ yC ] )
            inferSbDcSigCoeffFlag = 0
        }
        if( sig_coeff_flag[ xC ][ yC ] ) {
          coeff_sign_flag[ n ]                                                       ae(v)
          abs_level_gtX_flag[ n ][ 0 ]                                               ae(v)
          if( abs_level_gtX_flag[ n ][ 0 ] )
            par_level_flag[ n ]                                                      ae(v)
        }
        AbsLevelPassX[ xC ][ yC ] =
          sig_coeff_flag[ xC ][ yC ] + par_level_flag[ n ] + abs_level_gtX_flag
            [ n ][ 0 ]
      }
      /* Greater than X scan passes (numGtXFlags=5) */
      for( i = 1; i <= numGtXFlags - 1 && abs_level_gtX_flag[ n ][ i - 1 ] ; i++ ) {
        for( n = numSbCoeff - 1;n >= 0; n- - ) {
          xC =( xS << log2SbSize ) + DiagScanOrder[ log2SbSize ][ log2SbSize ]
            [ n ][ 0 ]
          yC =( yS << log2SbSize ) + DiagScanOrder[ log2SbSize ][ log2SbSize ]
            [ n ][ 1 ]
          abs_level_gtX_flag[ n ][ i ]                                               ae(v)
            AbsLevelPassX[ xC ][ yC ] += 2 * abs_level_gtX_flag[ n ][ i ]
        }
      }
      /* remainder scan pass */
      for( n = numSbCoeff - 1; n >= 0; n- -) {
        xC = ( xS << log2SbSize ) + DiagScanOrder[ log2SbSize ][ log2SbSize ]
          [ n ][ 0 ]
        yC = ( yS << log2SbSize ) + DiagScanOrder[ log2SbSize ][ log2SbSize ]
          [ n ][ 1 ]
        if( abs_level_gtX_flag[ n ][ numGtXFlags - 1 ] )
          abs_remainder[ n ]                                                         ae(v)
        TransCoeffLevel[ x0 ][ y0 ][ cIdx ][ xC ][ yC ] = ( 1 - 2 * coeff_sign_flag
          [ n ] ) *
                    ( AbsLevelPassX[ xC ][ yC ] + abs_remainder[ n ] )
      }
    }
  }
}
```

VI. Interactions Between Lossy Coding Modes and Lossless Coding Modes

In some embodiments, lossless coding modes are employed. Accordingly, syntax elements enabling the lossless coding modes can interact with operations of lossy coding modes. Lossy coding modes may create differences between input and reconstructed video signals. Examples of Lossy coding modes include multiple transform selection (MTS), secondary transform (ST), joint chroma residual entropy coding, in-loop reshaper (or namely luma mapping with chroma scaling, LMCS), combined intra and inter prediction (CIIP), quantized-domain (or quantized residual) BDPCM, dependent quantization, a transform skip (TS) coding mode, a sub-block transform (SBT) coding mode, and the like.

In some embodiments, a flag can be signaled at CU level to indicate whether a lossless coding mode is enabled for a respective coding block (or a respective coding unit). As an example, Table 6 shows coding unit syntax. The syntax element in row 1 of Table 6, cu_lossless_mode_flag, indicates whether a lossless coding mode is applied to the coding block (or coding unit) (x0, y0, cbWidth, cbHeight, treeType) as specified by the syntax in Table 6. In an example, the cu_lossless_mode_flag equal to 1 can specify that the lossless coding mode is enabled for the coding unit, while the cu_lossless_mode_flag equal to 0 can specify that the lossless coding mode is disabled for the coding unit.

TABLE 6

| Row number | coding_unit(x0, y0, cbWidth, cbHeight, treeType ) { | Descriptor |
|---|---|---|
| 1 * | cu_lossless_mode_flag | ae(v) |
| 2 | if( slice_type != I \| \| sps_ibc_enabled_flag ) { | |
| 3 |   if( treeType != DUAL_TREE_CHROMA ) | |
| 4 |     cu_skip_flag[ x0 ][ y0 ] | ae(v) |
| 5 |   if( cu_skip_flag[ x0 ][ y0 ] = = 0 && slice_type ) != I | |
| 6 |     pred_mode_flag | ae(v) |
| 7 |   if( ( ( slice_type = = I && cu_skip_flag[ x0 ][ y0 ] = = 0) \| ( slice_type != I && CuPredMode[ x0 ][ y0 ] != MODE_INTRA) ) && sps_ibc_enabled_flag ) | |
| 8 |     pred_mode_ibc_flag | ae(v) |
| 9 | } | |
| 10 | ...... | |
| 11 | } | |

In some embodiments, a syntax element may be signaled to indicate whether a lossless mode can be allowed for current video data associated with the syntax element. For example, the current data can be a tile, a slice, a tile group, a picture, a sequence, entire video. Accordingly, the syntax element can be signaled at a tile header, a slice header, a time group header, a PPS, a SPS, a video parameter set (VPS), or the like. In one example, the syntax element indicating whether a lossless mode is enabled for current video data is denoted by lossless_mode_enable_flag. Semantics of the lossless_mode_enable_flag is as follows: lossless_mode_enable_flag equal to 1 specifies that cu_lossless_mode_flag is present. lossless_mode_enable_flag equal to 0 specifies that cu_lossless_mode_flag is not present.

Table 7 shows an example of coding unit syntax. At row 1 of Table 7, a lossless_mode_enable_flag is verified. When the lossless_mode_enable_flag is true (e.g., having a value of 1), it can be determined that a next syntax element is a cu_lossless_mode_flag. Otherwise, it can be determined that no cu_lossless_mode_flag is present.

TABLE 7

| Row number | coding_unit( x0, y0, cbWidth, cbHeight, treeType ) { | Descriptor |
|---|---|---|
| 1 * | if( lossless_mode_enable_flag ) { | |
| 2 * |   cu_lossless_mode_flag | ae(v) |
| 3 | if( slice_type != I \| \| sps_ibc_enabled_flag ) { | |
| 4 |   if( treeType != DUAL_TREE_CHROMA ) | |
| 5 |     cu_skip_flag[ x0 ][ y0 ] | ae(v) |
| 6 |   if( cu_skip_flag[ x0 ][ y0 ] = = 0 && slice_type != I) | |
| 7 |     pred_mode_flag | ae(v) |
| 8 | if( ( ( slice_type = = I && cu_skip_flag[ x0 ][ y0 ] = = 0) \| ( slice_type != I && CuPredMode[ x0 ][ y0 ] != && MODE_INTRA ) ) sps_ibc_enabled_flag ) | |
| 9 |   pred_mode_ibc_flag | ae(v) |
| 10 | } | |
| 11 | ...... | |
| 12 | } | |

In an embodiment, when a lossless coding mode flag cu_lossless_mode_flag is signaled with a value which indicates lossless coding mode is enabled for a current CU, then a joint chroma residual coding mode is not applied and a related indication flag tu_joint_cbcr_residual is not signaled. The tu_joint_cbcr_residual can indicate whether the joint chroma residual coding mode is enabled or not.

Table 8 shows an example of residual coding syntax of a coding block defined as (x0, y0, log2TbWidth, log2TbHeight, cIdx). At row 1 of Table 8, a cu_lossless_mode_flag is coding block), it can be determined an indication flag tu_joint_cbcr_residual is not signaled. When the cu_lossless_mode_flag is false (indicating a lossless mode is not enabled for the coding block), it can be determined the next syntax element is the indication flag tu_joint_cbcr_residual depending on a result (Boolean value) of cIdx==2 && tu_cbf_cb[x0][y0].

TABLE 8

| Row number | residual_coding( x0, y0, log2TbWidth, log2TbHeight, cIdx ) { | Descriptor |
|---|---|---|
| 1 * | if( cIdx == 2 && tu_cbf_cb[ x0 ][ y0 ] && !cu_lossless_mode_flag) { | |
| 2 |   tu_joint_cbcr_residual[ x0 ][ y0 ] | ae(v) |
| 3 |   if( tu_joint_cbcr_residual [ x0 ][ y0 ] ) { | |
| 4 |     return | |
| 5 |   } | |
| 6 | ... | |
| 7 | } | |

In an embodiment, when a lossless coding mode flag cu_lossless_mode_flag is signaled with a value which indicates lossless coding mode is enabled for a current CU, then LMCS is not applied no matter LMCS is enabled for the current slice (or picture, or video sequence) or not.

As an example, FIG. 12 shows a text (1200) of a specification of a video coding standard that is modified to accommodate implementation of a lossless coding mode. A reconstruction process of a coding block based on a slice_lmcs_enabled_flag is described in the text (1200). The slice_lmcs_enabled_flag can be signaled in a slice header, and indicate whether LMCS is enabled for a respective slice that includes the coding block. At a paragraph (1201), a condition (1202) of "cu_lossless_mode_flag is equal to 1" is added. According to the modified paragraph (1201), when the condition (1202) is true (a lossless mode is enabled), a first operation (1203) can be performed, which is equivalent to disabling the LMCS. When the condition (1202) is false, the first operation (1203) or a second operation (1204) can be performed depending on the value of slice_lmcs_enabled_flag.

FIG. 13 shows another text (1300) of a specification of a video coding standard that is modified to accommodate implementation of a lossless coding mode. A prediction process of CIIP mode for processing a coding block is described in the text (1300). The prediction process can depend on a slice_lmcs_enabled_flag. At a paragraph (1301), a condition (1302) of "cu_lossless_mode_flag is equal to 0" is added. According to the modified paragraph (1301), when the condition (1302) is false (a lossless mode is enabled), an operation (1303) can be skipped, which is equivalent to disabling the LMCS. When the condition (1302) is true, the operation (1303) can be performed depending on the value of slice_lmcs_enabled_flag.

In an embodiment, when a lossless coding mode flag cu_lossless_mode_flag is signaled with a value which indicates lossless coding mode is enabled for a current CU, then residual domain BDPCM is not applied or signaled.

As an example, Table 9 shows an example of coding unit syntax for coding a coding unit. At row 1 of Table 9, a high level syntax lossless_mode_enable_flag is checked. When the lossless_mode_enable_flag is true, it can be determined a cu_lossless_mode_flag is signaled at row 2. At row 12, the cu_lossless_mode_flag is used for verification. When the cu_lossless_mode_flag is true, it can be determined a bdpcm_flag at row 13 is not signaled. Thus, the respective residual domain BDPCM can be disabled. The bdpcm_flag can be a syntax element indicating whether residual domain BDPCM coding mode is enabled for the current coding unit.

TABLE 9

| Row number | coding_unit( x0, y0, cbWidth, cbHeight, treeType) { | Descriptor |
|---|---|---|
| 1 * | if( lossless_mode_enable_flag ) ( | |
| 2 * |   cu_lossless_mode_flag | ae(v) |
| 3 | if( tile_group_type != I \| \| sps_ibc_enabled_flag ) ( | |
| 4 |   if( treeType != DUAL_TREE_) CHROMA | |
| 5 |     cu_skip_flag[ x0 ][ y0 ] | ae(v) |
| 6 |   if( cu_skip_flag[ x0 ][ y0 ] = = 0 && tile_group_type != I) | |
| 7 |     pred_mode_flag | ae(v) |
| 8 | if( ( ( tile_group_type = = I && cu_skip_flag [ x0 ][ y0 ] = = 0) \| \| ( tile_group_type != I && CuPredMode [ x0 ][ y0 ] != MODE_INTRA ) ) && sps_ibc_enabled_flag ) | |
| 9 |   pred_mode_ibc_flag | ae(v) |
| 10 | } | |

TABLE 9-continued

| Row number | coding_unit( x0, y0, cbWidth, cbHeight, treeType) { | Descriptor |
|---|---|---|
| 11 | if( CuPredMode[ x0 ][ y0 ] = = MODE_INTRA ) { | |
| 12 * | if( pred_mode_flag = = MODE_INTRA && ( cIdx == 0 ) && ( cbWidth <= 32 ) && ( CbHeight <= 32 ) && !cu_lossless_mode_flag ) { | |
| 13 | bdpcm_flag[ x0 ][ y0 ] | ae(v) |
| 14 | if( bdpcm_flag[ x0 ][ y0 ] ) { | |
| 15 | bdpcm_dir_flag[ x0 ][ y0 ] | ae(v) |
| 16 | } | |
| 17 | else { | |
| 18 | ...... | |
| 19 | } else if( treeType != DUAL_TREE_CHROMA ){/* MODE_INTER or MODE _IBC */ | |
| 20 | ...... | |
| 21 | } | |
| 22 | ....... | |
| 23 | } | |

In an embodiment, when a lossless coding mode flag cu_lossless_mode_flag is signaled with a value which indicates lossless coding mode is enabled for current CU, some coding modes (e.g., MTS, transform skip (TS) mode, SBT, and secondary transform (ST)) are not applied or related syntax elements are not signaled.

As an example, Table 10 shows coding unit syntax for coding a coding unit. At row 18 of Table 10, a cu_lossless_mode_flag is used for verification. When the cu_lossless_mode_flag is true (indicating a lossless mode is enabled for the coding unit), an indication flag cu_sbt_flag at row 25 is not signaled. The cu_sbt_flag can indicate if SBT is enabled for the coding unit. Accordingly, the SBT is not applied. Similarly, at row 37 of Table 10, the cu_lossless_mode_flag is used for verification. When the cu_lossless_mode_flag is true, a syntax element, st_idx[x0][y0], at row 39 is not signaled. The st_idx[x0][y0] can represent a secondary transform index and indicate if secondary transform (ST) mode is enabled for the coding unit. Accordingly, the ST mode is not applied.

TABLE 10

| Row number | coding_unit( x0, y0, cbWidth, cbHeight, treeType) { | Descriptor |
|---|---|---|
| 1 | if( slice_type !=I \| \| sps_ibc_enabled_flag ) { | |
| 2 | if( treeType != DUAL_TREE_CHROMA ) | |
| 3 | cu_skip_flag[ x0 ][ y0 ] | ae(v) |
| 4 | if( cu_skip_flag[ x0 ][ y0 ] = = 0 && slice_type != I) | |
| 5 | pred_mode_flag | ae(v) |
| 6 | if( ( ( slice_type = = I && cu_skip_flag[ x0 ][ y0 ] = =0) \| \| ( slice_type != I && CuPredMode[ x0 ][y0] !=MODE_INTRA ) ) && sps_ibc_enabled_flag ) | |
| 7 | pred_mode_ibc_flag | ae(v) |
| 8 | } | |
| 9 | if( CuPredMode[ x0 ][ y0] = = MODE_INTRA ) { | |
| 10 | ...... | |
| 11 | } else if( treeType != DUAL_TREE_CHROMA ) {/* MODE_INTER or MODE _IBC */ | |
| 12 | ...... | |
| 13 | } | |
| 14 | if( !pcm_flag[ x0 ][ y0 ]) { | |
| 15 | if( CuPredMode[ x0 ][ y0 ] != MODE_INTRA && merge_flag[ x0 ][ y0 ] = = 0) | |
| 16 | cu_cbf | ae(v) |
| 17 | if( cu_cbf ) { | |
| 18* | if( CuPredMode[ x0 ][ y0 ] = = MODE_INTER && sps_sbt_enabled_flag && !ciip_flag[ x0 ][ y0 ] && !cu_lossless_mode_flag ) { | |
| 19 | if( cbWidth <= MaxSbtSize && cbHeight <= MaxSbtSize ) { | |
| 20 | allowSbtVerH = cbWidth >= 8 | |
| 21 | allowSbtVerQ = cbWidth >= 16 | |
| 22 | allowSbtHorH = cbHeight >= 8 | |
| 23 | allowSbtHorQ = cbHeight >= 16 | |
| 24 | if( allowSbtVerH \| \| allowSbtHorH \| \| allowSbtVerQ \| \| allowSbtHorQ ) | |
| 25 | cu_sbt_flag | ae(v) |
| 26 | } | |
| 27 | if( cu_sbt_flag ) { | |
| 28 | if( ( allowSbtVerH \| \| allowSbtHorH) && ( allowSbtVerQ \| \| allowSbtHorQ) ) | |
| 29 | cu_sbt_quad_flag | ae(v) |
| 30 | if( ( cu_sbt_quad_flag && allowSbtVerQ && allowsbtHorQ ) \| \| ( !cu_sbt_quad_flag && allowSbtVerH && allowSbtHorH ) ) | |
| 31 | cu_sbt_horizontal_flag | ae(v) |
| 32 | cu_sbt_pos_flag | ae(v) |
| 33 | } | |
| 34 | } | |

TABLE 10-continued

| Row number | coding_unit( x0, y0, cbWidth, cbHeight, treeType) { | Descriptor |
|---|---|---|
| 35 | numZeroOutSigCoeff = 0 | |
| 36 | transform_tree( x0, y0, cbWidth, cbHeight, treeType) | |
| 37* | if( Min( cbWidth, cbHeight) >= 4 && sps_st_enabled_flag = = 1 && CuPredMode[ x0 ][ y0 ] = = MODE_INTRA && IntraSubPartitionsSplitType = = ISP_NO_SPLIT && !cu_lossless_mode_flag) { | |
| 38 | if( ( numSigCoeff > ( ( treeType == SINGLE_TREE ) ? 2: 1 ) ) && numZeroOutSigCoeff == 0) { | |
| 39 | st_idx[ x0 ][ y0 ] | ae(v) |
| 40 | } | |
| 41 | } | |
| 42 | } | |
| 43 | } | |
| 44 | } | |

As another example, Table 11 shows transform unit syntax for processing a coding unit. At row 31 of Table 11, a cu_lossless_mode_flag is used for verification. When the cu_lossless_mode_flag is true (indicating a lossless mode is enabled for the coding unit), an indication flag transform_skip_flag[x0][y0] at row 33, and a syntax element tu_mts_idx[x0][y0] at row 35 are not signaled. The transform_skip_flag[x0][y0] can indicate if TS mode is enabled for the coding unit. The tu_mts_idx[x0][y0] can indicate an index of a selected transform, and if the MTS is enabled. Accordingly, the TS mode or the MTS is not applied.

TABLE 11

| Row number | transform_unit( x0, y0, tbWidth, tbHeight, treeType, subTuIndex ) { | Descriptor |
|---|---|---|
| 1 | if( treeType = = SINGLE_TREE \| \| treeType = = DUAL_TREE_LUMA ) { | |
| 2 | if( ( IntraSubPartitionsSplitType = = ISP_NO_SPLIT && ! ( cu_sbt_flag && ( ( subTuIndex = = 0 && cu_sbt_pos_flag ) \| \| ( subTuIndex = = 1 && !cu_sbt_pos_flag ) ) ) ) \| \| ( IntraSubPartitionsSplitType != ISP_NO_SPLIT && ( subTuIndex < NumIntraSubPartitions − 1 \| \| !InferTuCbfLuma ) ) ) | |
| 3 | tu_cbf_luma[ x0 ][ y0 ] | ae(v) |
| 4 | if (IntraSubPartitionsSplitType != ISP_NO_SPLIT) | |
| 5 | InferTuCbfLuma = InferTuCbfLuma && !tu_cbf_luma[ x0 ][ y0 ] | |
| 6 | } | |
| 7 | if( ( treeType = = SINGLE_TREE \| \| treeType = = DUAL_TREE_CHROMA ) { | |
| 8 | if( ( IntraSubPartitionsSplitType = = ISP_NO_SPLIT && ! ( cu_sbt_flag && ( ( subTuIndex = = 0 && cu_sbt_pos_flag ) \| \| ( subTuIndex = = 1 && !cu_sbt_pos_flag ) ) ) ) \| \| ( IntraSubPartitionsSplitType !=ISP_NO_SPLIT && ( subTuIndex = = NumIntraSubPartitions − 1 ) ) ) { | |
| 9 | tu_cbf_cb[ x0 ][ y0 ] | ae(v) |
| 10 | tu_cbf_cr[ x0 ][ y0 ] | ae(v) |
| 11 | } | |
| 12 | } | |
| 13 | if( IntraSubPartitionsSplitType !=ISP_NO_SPLIT && treeType = = SINGLE_TREE && subTuIndex = = NumIntraSubPartitions − 1 ) ) | |
| 14 | xC = CbPosX[ x0 ][ y0 ] | |
| 15 | yC = CbPosY[ x0 ][ y0 ] | |
| 16 | wC = CbWidth[ x0 ][ y0 ] / 2 | |
| 17 | hC = CbHeight[ x0 ][ y0 ] / 2 | |
| 18 | } else | |
| 19 | xC = x0 | |
| 20 | yC = y0 | |
| 21 | wC = tbWidth / SubWidthC | |
| 22 | hC =tbHeight / SubHeightC | |
| 23 | } | |
| 24 | if( ( tu_cbf_luma[ x0 ][ y0 ] \| \| tu_cbf_cb[ x0 ][ y0 ] \| \| tu_cbf_cr [ x0 ][ y0 ] ) && treeType !=DUAL_TREE_CHROMA ) { | |
| 25 | if( cu_qp_delta_enabled_flag && !IsCuQpDeltaCoded ) { | |
| 26 | cu_qp_delta_abs | ae(v) |

TABLE 11-continued

| Row number | transform_unit( x0, y0, tbWidth, tbHeight, treeType, subTuIndex ) { | Descriptor |
|---|---|---|
| 27 |     if( cu_qp_delta_abs ) | |
| 28 |         cu_qp_defta_sign_flag | ae(v) |
| 29 |     } | |
| 30 | } | |
| 31* | if( tu_cbf_luma[ x0 ][ y0 ] && treeType != DUAL_TREE_CHROMA<br>&& ( tbWidth <= 32) && ( tbHeight <= 32)<br>&& ( IntraSubPartitionsSplit[ x0 ][ y0 ] = = ISP_NO_SPLIT)<br>&& ( !cu_sbt_flag )<br>&& (!cu_lossless_mode_flag) ) { | |
| 32 |     if( transform_skip_enabled_flag && tbWidth <=MaxTsSize<br>&& tbHeight <=<br>MaxTsSize ) | |
| 33 |         transform_skip_flag[ x0 ][ y0 ] | ae(v) |
| 34 |     if( (( CuPredMode[ x0 ][ y0 ] !=MODE_INTRA &&<br>sps_explicit_mts_inter_enabled_flag )<br>        | | ( CuPredMode[ x0 ][ y0 ] = = MODE_INTRA &&<br>sps_explicit_mts_intra_enabled_flag ))<br>&& ( tbWidth <= 32) && ( tbHeight <= 32) &&<br>( !transform_skip_flag[ x0 ][ y0 ] ) ) | |
| 35 |         tu_mts_idx[ x0 ][ y0 ] | ae(v) |
| 36 |     } | |
| 37 | if( tu_cbf_luma[ x0 ][ y0 ] ) | |
| 38 |     residual_coding( x0, y0, Log2( tbWidth ), Log2( tbHeight ), 0) | |
| 39 | if( tu_cbf_cb[ x0 ][ y0 ] ) | |
| 40 |     residual_coding( xC, yC, Log2( wC ), Log2( hC ), 1) | |
| 41 | if( tu_cbf_cr[ x0 ][ y0 ] ) | |
| 42 |     residual_coding( xC, yC, Log2( wC ), Log2( hC ), 2) | |
| 43 | } | |

In an embodiment, a high level syntax element, denoted by use_lossless_mode_flag, can be signaled in a SPS, a PPS, a VPS, a slice header, a tile header or a tile group header, to indicate whether only lossless coding modes are allowed for the current sequence, picture, video, slice, tile or tile group, respectively. When a lossless coding mode is used, lossy coding modes (or lossy coding tools) can be excluded for encoding and decoding.

VII. Selection from Multiple Coefficient Coding Schemes

In some examples, lossless coding is employed, and prediction residuals are entropy coded in spatial domain without transform. In some examples, transform is applied to prediction residuals followed by regular transform coefficient entropy coding. The entropy coding schemes for regular transform coefficients and transform skip residuals can be designed differently. For example, as described in Section V. Residual Coding Schemes, the neighborhood template is more complex for regular transform coefficient coding, the scanning order is forward scan for transform skip residual coding and sign bits are coded using context coded bins in transform skip residual coding. Thus, in some embodiments, corresponding to different scenarios (e.g., transform coefficients coding or coding of residuals without transform), different coefficient coding schemes can suitably be selected and applied. To facilitate the selection of coefficient coding schemes, syntax elements indicating selection from multiple coefficient coding schemes can be signaled in a bit stream from a decoder to an encoder.

In some embodiments, given multiple coefficient coding schemes, a block-level index (or flag or indicator) may be signaled to indicate which one (or more) of the given multiple coefficient coding schemes can be used for coefficient coding of a current block.

In an embodiment, the given multiple coefficient coding schemes include a coefficient coding scheme applicable to spatial prediction residuals without transform, e.g., residuals using transform skip (TS) mode or BDPCM mode, and a coefficient coding scheme applicable to regular transform coefficient coding. In one example, the two coefficient coding schemes are the ones defined in VVC (Draft 6) (JVET-O2001), "clause 7.3.8.11 Residual coding syntax" (syntax tables of residual_coding and residual_ts_coding).

Tables 12-14 show example syntax tables where a syntax element, tu_residual_coding_sel[x0][y0], is used to indicate which one of two candidate coefficient coding schemes is used. The tu_residual_coding_sel[x0][y0] equal to 1 specifies that residual_coding is selected for entropy coding (decoding) the residuals of a current TU, and tu_residual_coding_sel[x0][y0] equal to 0 specifies that residual_ts_coding is selected for entropy coding (decoding) the residuals of the current TU. The residual_coding and the residual_ts_coding can be two different coefficient coding schemes, for example, defined by VVC (Draft 6) (JVET-O2001), "clause 7.3.8.11". In an example, when tu_residual_coding_sel[x0][y0] is not present in the current TU, the value of tu_residual_coding_sel[x0][y0] is inferred to be equal to 0.

Table 12 shows transform unit syntax for coding a transform unit. At row 2 of Table 12, a syntax element, tu_residual_coding_sel[x0][y0], is received. At row 4, when tu_residual_coding_sel[x0][y0] is true, the coefficient coding scheme of residual_coding at row 5 is selected for processing the transform unit. When tu_residual_coding_sel[x0][y0] is false, either residual-coding or residual_ts_coding can be selected depending on the value of a transform_skip_flag[x0][y0] at row 4. In addition, at rows 9-12, the Cr and Cb chroma components are processed with the coefficient coding scheme of residual_coding.

TABLE 12

| Row number | transform_unit( x0, y0, tbWidth, tbHeight, treeType, subTuIndex, chType ) { | Descriptor |
|---|---|---|
| 1 | ...... | |
| 2 * | tu_residual_coding_sel[ x0 ][ y0 ] | ae(v) |
| 3 | if( tu_cbf_luma[ x0 ][ y0 ] ) { | |
| 4 * | if( !transform_skip_flag[ x0 ][ y0 ] \| \| tu_residual_coding_sel[ x0 ][ y0 ] ) | |
| 5 | residual_coding( x0, y0, Log2( tbWidth ), Log2( tbHeight ), 0) | |
| 6 | else | |
| 7 | residual_ts_coding( x0, y0, Log2( tbWidth ), Log2( tbHeight ), 0) | |
| 8 | } | |
| 9 | if( tu_cbf_cb[ x0 ][ y0 ] ) | |
| 10 | residual_coding( xC, yC, Log2(wC ), Log2( hC ), 1) | |
| 11 | if( tu_cbf_cr[ x0 ][ y0 ] && !( tu_cbf_cb[ x0 ][ y0 ] && tu_joint_cbcr_residual_flag[ x0 ][ y0 ] )) { | |
| 12 | residual_coding( xC, yC, Log2(wC ), Log2( hC ), 2) | |
| 13 | } | |
| 14 | } | |

Table 13 shows another transform unit syntax for coding a transform unit. At row 2 of Table 12, a syntax element, tu_residual_coding_sel[x0][y0], is received. At row 4, an additional syntax, cu_transquant_bypass_flag, is verified. The cu_transquant_bypass_flag indicates whether transform and quantization processing is bypassed. When the cu_transquant_bypass_flag is true, and the transform and quantization processing is bypassed, the selection of coefficient coding schemes represented by tu_residual_coding_sel[x0][y0] can be applied at row 4. When the cu_transquant_bypass_flag is false, the selection is not applied.

For the scenario that the cu_transquant_bypass_flag is true, when tu_residual_coding_sel[x0][y0] is true, the coefficient coding scheme of residual_coding at row 5 is selected for processing the transform unit. When tu_residual_coding_sel[x0][y0] is false, either residual-coding or residual_ts_coding can be selected depending on the value of a transform_skip_flag[x0][y0] at row 4. In addition, at rows 9-12 of Table 13, the Cr and Cb chroma components are processed with the coefficient coding scheme of residual-coding.

TABLE 13

| Row number | transform_unit( x0, y0, tbWidth, tbHeight, treeType, subTuIndex, chType ) ( | Descriptor |
|---|---|---|
| 1 | ...... | |
| 2 * | tu_residual_coding_sel[ x0 ][ y0 ] | ae(v) |
| 3 | if( tu_cbf_luma[ x0 ][ y0 ] ) { | |
| 4 * | if( !transform_skip_flag[ x0 ][ y0 ] \| \| (tu_residual_coding_sel[ x0 ][ y0 ] && cu_transquant_bypass_flag) ) | |
| 5 | residual_coding( x0, y0, Log2( tbWidth ), Log2( tbHeight ), 0) | |
| 6 | else | |
| 7 | residual_ts_coding( x0, y0, Log2( tbWidth ), Log2( tbHeight ), 0) | |
| 8 | } | |
| 9 | if( tu_cbf_cb[ x0 ][ y0 ] ) | |
| 10 | residual_coding( xC, yC, Log2( wC ), Log2( hC ), 1) | |
| 11 | if( tu_cbf_cr[ x0 ][ y0 ] && !( tu_cbf_cb[ x0 ][ y0 ] && tu_joint_cbcr_residual_flag[ x0 ][ y0 ] )) { | |
| 12 | residual_coding( xC, yC, Log2( wC ), Log2( hC ), 2) | |
| 13 | } | |
| 14 | } | |

Table 14 shows another transform unit coding syntax for coding a transform unit. At row 2 of Table 14, a syntax element, tu_residual_coding_sel[x0][y0], is received. From row 4 to row 7, selection of coefficient coding schemes is applied to luma component of the transform unit based on the tu_residual_coding_sel[x0][y0] syntax element. In addition, different from Tables 12 and 13 where the Cr and Cb chroma components are processed with the coefficient coding scheme of residual_coding, at rows 10-13 and rows 15-18 of Table 14, coefficient coding scheme selection is applied to the Cr and Cb chroma components similarly as for the luma component.

TABLE 14

| Row number | transform_unit( x0, y0, tbWidth, tbHeight, treeType, subTuIndex,chType ) { | Descriptor |
|---|---|---|
| 1 | ...... | |
| 2 * | tu_residual_coding_sel[ x0 ][ y0 ] | ae(v) |
| 3 | if( tu_cbf_luma[ x0 ][ y0 ] ) { | |
| 4 * | if( !transform_skip_flag[ x0 ][ y0 ] \| \| tu_residual_coding_sel[ x0 ][ y0 ] ) | |
| 5 | residual_coding( x0, y0, Log2( tbWidth ), Log2( tbHeight ), 0) | |
| 6 | else | |
| 7 | residual_ts_coding( x0, y0, Log2( tbWidth ), Log2( tbHeight ), 0) | |
| 8 | } | |
| 9 | if( tu_cbf_cb[ x0 ][ y0 ] ) | |
| 10* | if( !transform_skip_flag[ x0 ][ y0 ][1] \| \| tu_residual_coding_sel[ x0 ][ y0 ] ) | |
| 11* | residual_coding( xC, yC, Log2( wC ), Log2( hC ), 1) | |
| 12* | else | |
| 13* | residual_ts_coding( xC, yC, Log2( wC ), Log2( hC ), 1) | |
| 14 | if( tu_cbf_cr[ x0 ][ y0 ] && !( tu_cbf_cb[ x0 ][ y0 ] && tu_joint_cbcr_residual_flag[ x0 ][ y0 ] )) { | |
| 15* | if( !transform_skip_flag[ x0 ][ y0 ] \| \| tu_residual_coding_sel[ x0 ][ y0 ] ) | |
| 16* | residual_coding( xC, yC, Log2( wC ), Log2( hC ), 2) | |
| 17* | Else | |
| 18* | residual_ts_coding( xC, yC, Log2( wC ), Log2( hC ), 2) | |
| 19 | } | |
| 20 | } | |

In an embodiment, the block-level index (or flag or indicator) can be signaled for a certain coding mode, or several certain coding modes. For example, the one or several coding modes can be a lossless coding mode, a residual domain BDPCM mode, a transform skip (TS) mode, an intra prediction mode, an IBC mode, a JCCR mode, an MTS mode, an LFNST mode, a multiple reference line (MRL) intra prediction mode, an inter prediction mode, a palette mode, a a cross-component linear model (CCLM) mode. When those coding modes are employed in various examples, the block-level index (or flag or indicator) can be signaled to indicate how a suitable coefficient coding scheme is selected from multiple coefficient coding schemes.

In an embodiment, the block-level index (or flag or indicator) signaled to indicate which one (or more) of the given multiple coefficient coding schemes can be used for coefficient coding of current block can be context coded. The context can be derived based on whether a certain coding mode, or one of several certain coding modes (e.g., the certain coding modes described above) is selected. For example, a rate-distortion optimization (RDO) based evaluation process can be performed to determine which one of multiple coefficient coding schemes is optimal for a current block. When MTS mode is used for processing a current block, selection of a regular transform coefficient coding scheme can have a higher probability than selection of a coding scheme for residuals without transform. Thus, a probability of a value of the block level index being 0 or 1 can depend on the employed coding mode.

In an embodiment, the block-level index (or flag or indicator) can be signaled separately for different color components. For example, the block-level index (or flag or indicator) can be signaled for each of luma, Cb or Cr color components. Accordingly, different color components may have different selection of coefficient coding schemes.

In another example, one block-level index (or flag or indicator) is signaled for luma component, and one block-level index (or flag or indicator) is signaled for chroma components. For example, when one block-level index (or flag, or indicator) is signaled for chroma components, the block level-index can be shared between Cb and Cr color components.

VIII. Example Processes

Figure 14:
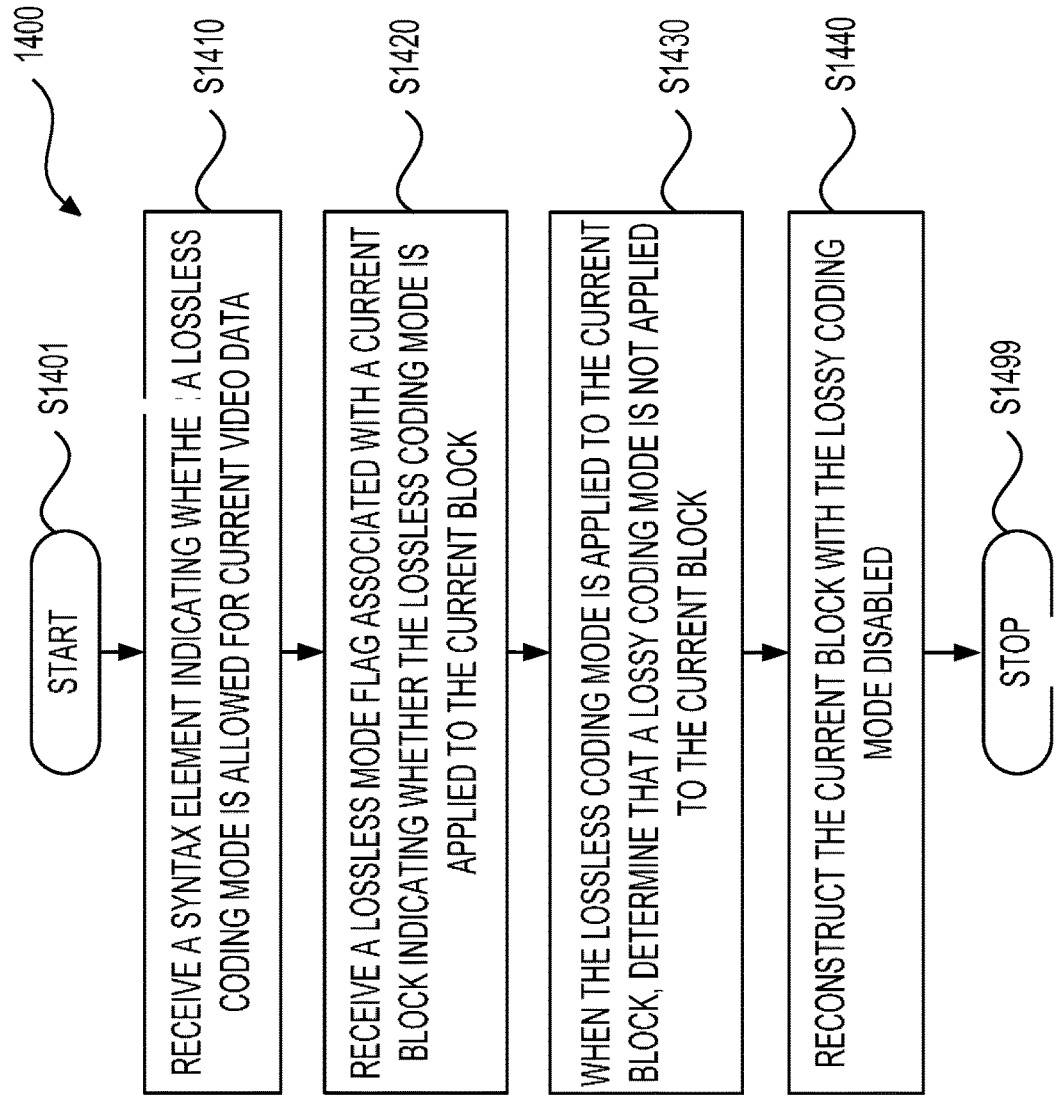
FIG. 14 shows a flow chart outlining a process (1400) according to an embodiment of the disclosure.

FIG. 14 shows a flow chart outlining a process (1400) according to an embodiment of the disclosure. The process (1400) can be used in the reconstruction of a block coded in a lossless mode. In various embodiments, the process (1400) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1400) is implemented in software instructions, thus when the processing circuitry executes the software instructions, the processing circuitry performs the process (1400). The process starts at (S1401) and proceeds to (S1410).

At (S1410), a high level syntax element indicating whether a lossless mode can be allowed for current video data can be received. When the lossless mode is allowed, block-level lossless mode flags can present in the bit stream of the video data. For example, the high level syntax element can be signaled for a tile, a slice, a tile group, a picture, a picture sequence, or entire video.

At (S1420), a lossless mode flag associated with a current block can be received. The lossless mode flag can indicate whether the lossless coding mode can be applied to the current block.

At (S1430), when the lossless mode flag indicates that the lossless coding mode is applied to the current block, it can be determined than a lossy coding mode is not applied to the current block. In an example, when the lossless mode flag indicates that the lossless coding mode is applied to the current block, it can be determined a syntax element associated with or indicating the lossy coding mode is not present. In an example, coding operations of a lossy coding mode in a processing process can be disabled when the lossless mode flag indicates that the lossless coding mode is applied to the current block.

At (S1440), the current block can be reconstructed with the lossy coding mode disabled. Examples of Tables 8-11 and FIGS. 12-13 provide examples of the lossy coding mode being disabled or not applied. The process (1400) can proceed to S1499 and terminate at S1499.

Figure 15:
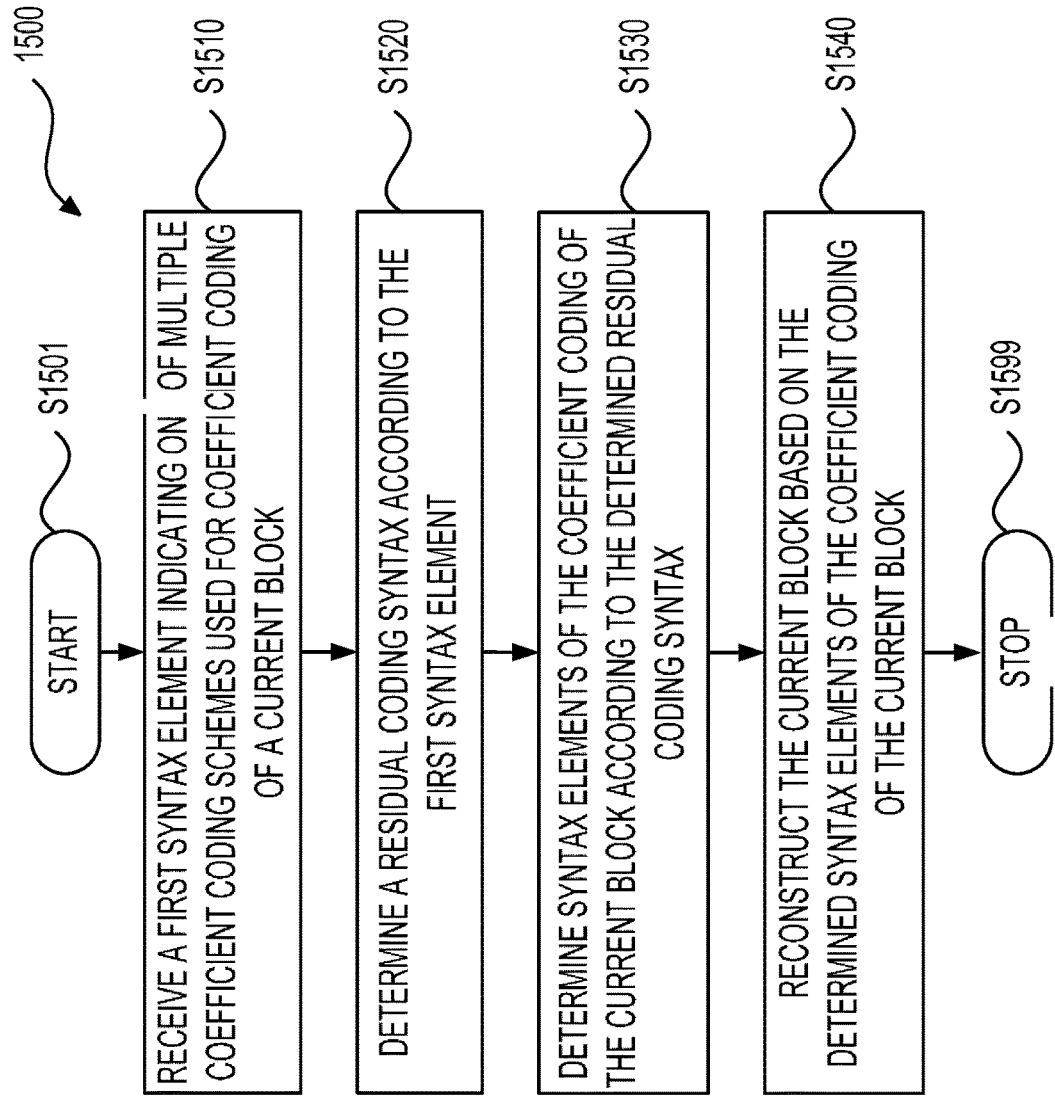
FIG. 15 shows another flow chart outlining a process (1500) according to an embodiment of the disclosure.

FIG. 15 shows another flow chart outlining a process (1500) according to an embodiment of the disclosure. The process (1500) can be used in the reconstruction of a current block. In various embodiments, the process (1500) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1500) is implemented in software instructions, thus when the processing circuitry executes the software instructions, the processing circuitry performs the process (1500). The process starts at (S1501) and proceeds to (S1510).

At (S1510), a first syntax element indicating one of multiple coefficient coding schemes used for coefficient coding of the current block can be received. For example, coefficients of the current block can be transform coefficients, or special domain prediction residuals without transform resulting from, for example, a transform skip mode, or a residual domain BDPCM mode. Corresponding to a type of the coefficients of the current block, different coefficient coding schemes can be selected for processing the coefficients to obtain a better coding efficiency at a decoder side.

At (S1520), a residual coding syntax can be determined according to the first syntax element. For example, the determined residual coding syntax can correspond to the coefficient coding scheme indicated by the first syntax element. In an example, the residual coding syntax can be one of the two sets of residual coding syntax defined in VVC (Draft 6) (JVET-O2001), "clause 7.3.8.11 Residual coding syntax" (syntax tables of residual_coding and residual_ts_coding). Tables 12-14 show examples of determining a residual coding syntax according a syntax element (e.g., the tu_residual_coding_sel[x0][y0]).

At (S1530), syntax elements of the coefficient coding of the current block can be determined according to the determined residual coding syntax. For example, corresponding to the two sets of residual coding syntax, different syntax elements of the coefficient coding of the current block can be recognized and received. For example, Table 5 shows the transform skip residual coding syntax (similar to the residual_ts_coding syntax defined in VVC (Draft 6) (VET-02001)). By following the Table 5 syntax, syntax elements, such as sig_coeff_flag, coeff_sign_flag, abs_remainder, or the like, that are resulting from the coefficient coding of residuals of a current block without transform can be determined.

At (S1540), the current block can be reconstructed based on the syntax elements determined at (S1530). For example, corresponding to the coefficient coding scheme indicated by the first syntax element at (S1510) (e.g., applicable for transform coefficients or spatial domain residual without transform), different processing may be conducted for reconstruction of the current block.

For example, for a coefficient coding scheme corresponding to the residual coding syntax residual_coding defined in VVC (Draft 6) (JVET-02001), an inverse quantization and inverse transformation process can be performed based on the syntax elements determined at (S1530) to obtain spatial residuals of the current block. For a coefficient coding scheme corresponding to the residual coding syntax residual_ts_coding defined in VVC (Draft 6) (JVET-O 2001), a residual domain BDPCM decoding process can be performed based on the syntax elements determined at (S1530) to obtain spatial residuals of the current block. By combining the residuals with a prediction block (e.g., inter- or intra-coded), the current block can be reconstructed in an example. The process (1500) proceeds to (S1599) and terminates at (S1599).

IX. Computer System

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
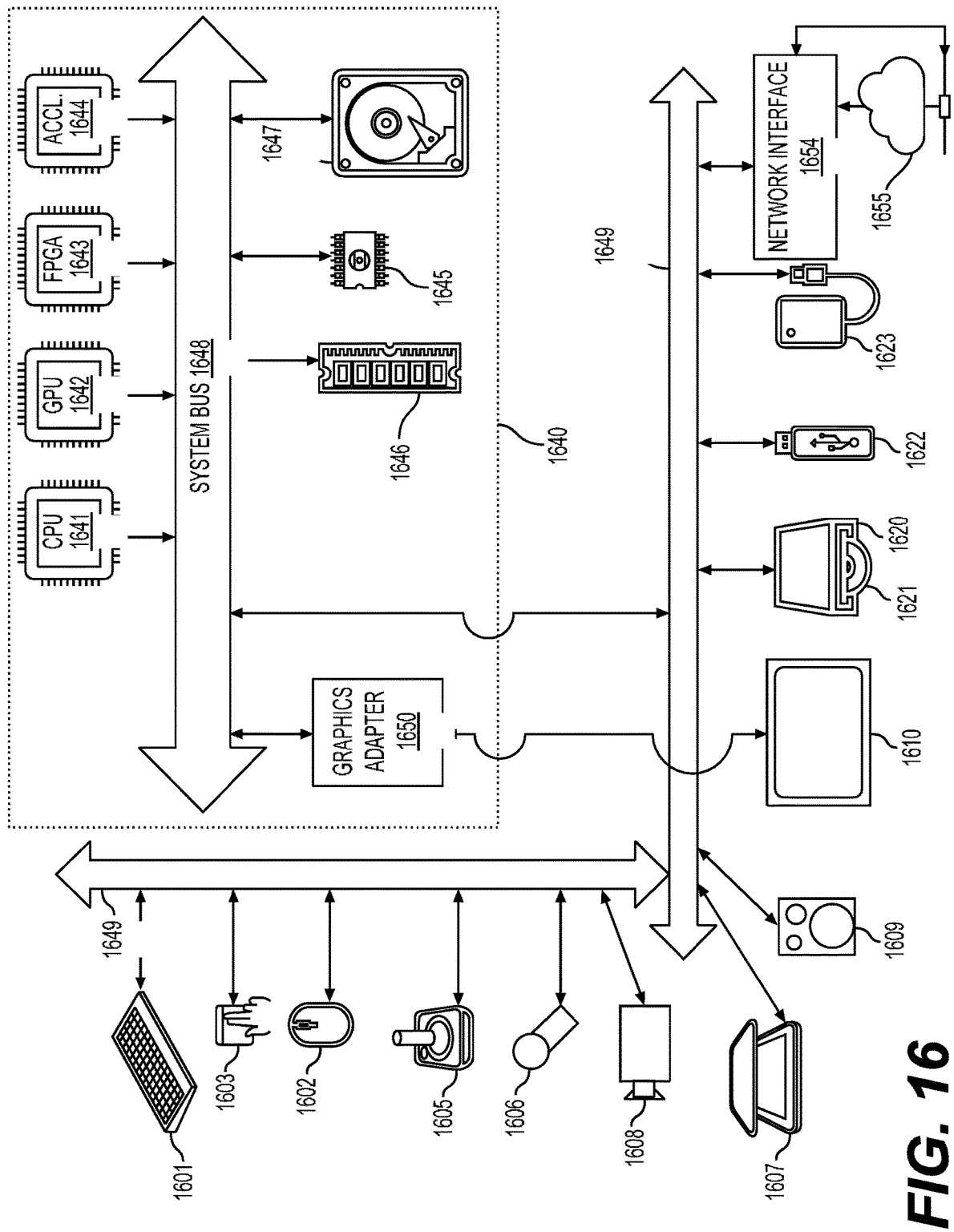
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

ASIC: Application-Specific Integrated Circuit
BMS: benchmark set
CANBus: Controller Area Network Bus
CBF: Coded block flag
CCLM: Cross-component Linear Model
CD: Compact Disc
CPUs: Central Processing Units
CRT: Cathode Ray Tube
CTB: Coding Tree Block
CTU: Coding Tree Unit
CU: Coding Unit
DT: DualTree
DVD: Digital Video Disc
FPGA: Field Programmable Gate Areas
GOPs: Groups of Pictures
GPUs: Graphics Processing Units
GSM: Global System for Mobile communications
HDR: high dynamic range
HEVC: High Efficiency Video Coding
HLS: High Level Syntax
HRD: Hypothetical Reference Decoder
IBC: Intra Block Copy
IC: Integrated Circuit
ISP: Intra Sub-Partitions
JCCR: Joint Cb Cr Residual Coding
JEM: joint exploration model
JVET: Joint Video Exploration Team
LAN: Local Area Network
LCD: Liquid-Crystal Display
LFNST: Low-Frequency Non-Separable Secondary Transform, or Low-Frequency Non-Separable Transform
LTE: Long-Term Evolution
MRL: Multiple reference line intra prediction
MV: Motion Vector
MTS: Multiple Transform Selection
MV: Motion Vector
OLED: Organic Light-Emitting Diode
PBs: Prediction Blocks
PCI: Peripheral Component Interconnect
PLD: Programmable Logic Device
PU: Prediction Unit
RAM: Random Access Memory
ROM: Read-Only Memory
RQT: Residual Quad-Tree
SBT: Sub-block Transform
SDR: standard dynamic range
SEI: Supplementary Enhancement Information
SNR: Signal Noise Ratio
SSD: solid-state drive
TU: Transform Unit
USB: Universal Serial Bus
VTM: Versatile Video Coding Test Model
VUI: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding at a video decoder, comprising:
   receiving a coding unit (CU) level lossless mode flag associated with a current block of a current picture comprising plural blocks, the CU level lossless mode flag indicating at a CU level whether a lossless coding mode is applied to the current block;
   in response to a determination that (i) a slice level flag indicates that a luma mapping with chroma scaling (LMCS) coding mode is enabled for a current slice of the current block and that (ii) the CU level lossless mode flag indicates that the lossless coding mode is applied to the current block, disabling the LMCS coding mode for the current block;
   in response to a determination that (i) the slice level flag indicates that the LMCS coding mode is enabled for the current slice of the current block and that (ii) the CU level lossless mode flag indicates that the lossless coding mode is not applied to the current block, enabling the LMCS coding mode for the current block; and
   reconstructing the current block with the LMCS coding mode disabled or enabled.

2. The method of claim 1, further comprising:
receiving a high level syntax element indicating whether the lossless coding mode is allowed for current video data referencing the high level syntax element, the high level syntax element being signaled in a video parameter set, a sequence parameter set, a picture parameter set, a slice header, a tile header, or a tile group header,
wherein the CU level lossless mode flag associated with the current block is received based on the high level syntax element indicating the lossless coding mode is allowed for the current video data.

3. The method of claim 1, further comprising:
in response to the CU level lossless mode flag indicating that the lossless coding mode is not applied to the current block, receiving a syntax element indicating whether joint chroma residual coding mode is applied to the current block.

4. The method of claim 1, further comprising:
in response to the CU level lossless mode flag indicating that the lossless coding mode is applied to the current block, determining that (i) a lossy coding mode is not applied to the current block or that (ii) a syntax element indicating whether the lossy coding mode is applied to the current block is not signaled, wherein
the lossy coding mode is one of:
joint chroma residual coding mode,
a combined intra and inter prediction (CIIP) coding mode,
a quantized residual block-based delta pulse code modulation (BDPCM) coding mode,
a multiple transform selection (MTS) coding mode,
a secondary transform (ST) coding mode,
a dependent quantization coding mode,
a transform skip (TS) coding mode, or
a sub-block transform (SBT) coding mode.

5. The method of claim 1, wherein the disabling the LMCS coding mode is performed further in response to a determination that (iii) a color component index is equal to 0, in addition to conditions (i) and (ii).

6. An apparatus of video decoding, comprising circuitry configured to:
receive a coding unit (CU) level lossless mode flag associated with a current block of a current picture comprising plural blocks, the CU level lossless mode flag indicating at a CU level whether a lossless coding mode is applied to the current block;
in response to a determination that (i) a slice level flag indicates that a luma mapping with chroma scaling (LMCS) coding mode is enabled for a current slice of the current block and that (ii) the CU level lossless mode flag indicates that the lossless coding mode is applied to the current block, disable the LMCS coding mode for the current block ;
in response to a determination that (i) the slice level flag indicates that the LMCS coding mode is enabled for the current slice of the current block and that (ii) the CU level lossless mode flag indicates that the lossless coding mode is not applied to the current block, enable the LMCS coding mode for the current block; and
reconstruct the current block with the LMCS coding mode disabled or enabled.

7. The apparatus of claim 6, wherein the circuitry is further configured to:
receive a high level syntax element indicating whether the lossless coding mode is allowed for current video data referencing the high level syntax element, the high level syntax element being signaled in a video parameter set, a sequence parameter set, a picture parameter set, a slice header, a tile header, or a tile group header,
wherein the CU level lossless mode flag associated with the current block is received based on the high level syntax element indicating the lossless coding mode is allowed for the current video data.

8. The apparatus of claim 6, wherein the circuitry is further configured to:
in response to the CU level lossless mode flag indicating that the lossless coding mode is not applied to the current block, receive a syntax element indicating whether joint chroma residual coding mode is applied to the current block.

9. The apparatus of claim 6, wherein the circuitry is configured to, in response to the CU level lossless mode flag indicating that the lossless coding mode is applied to the current block, determine that (i) a lossy coding mode is not applied to the current block or that (ii) a syntax element indicating whether the lossy coding mode is applied to the current block is not signaled, and
the second lossy coding mode is one of:
joint chroma residual coding mode,
a combined intra and inter prediction (CIIP) coding mode,
a quantized residual block-based delta pulse code modulation (BDPCM) coding mode,
a multiple transform selection (MTS) coding mode,
a secondary transform (ST) coding mode,
a dependent quantization coding mode, a transform skip (TS) coding mode, or
a sub-block transform (SBT) coding mode.

10. A non-transitory computer-readable medium storing instructions that, when executed by a processor, cause the processor to perform a method of video decoding, the method comprising:
receiving a coding unit (CU) level lossless mode flag associated with a current block of a current picture comprising plural blocks, the CU level lossless mode flag indicating at a CU level whether a lossless coding mode is applied to the current block;
in response to a determination that (i) a slice level flag indicates that a luma mapping with chroma scaling (LMCS) coding mode is enabled for a current slice of the current block and that (ii) the CU level lossless mode flag indicates that the lossless coding mode is applied to the current block, disabling the LMCS coding mode for the current block ;
in response to a determination that (i) the slice level flag indicates that the LMCS coding mode is enabled for a current slice of the current block and that (ii) the CU level lossless mode flag indicates that the lossless coding mode is not applied to the current block, enabling the LMCS coding mode for the current block; and
reconstructing the current block with the LMCS coding mode disabled or enabled.

11. The non-transitory computer-readable medium of claim 10, wherein the method further comprises:
receiving a high level syntax element indicating whether the lossless coding mode is allowed for current video data referencing the high level syntax element, the high level syntax element being signaled in a video parameter set, a sequence parameter set, a picture parameter set, a slice header, a tile header, or a tile group header,
wherein the CU level lossless mode flag associated with the current block is received based on the high level syntax element indicating the lossless coding mode is allowed for the current video data.

12. The non-transitory computer-readable medium of claim 10, wherein the method further comprises:
    in response to the CU level lossless mode flag indicating that the lossless coding mode is not applied to the current block, receiving a syntax element indicating whether joint chroma residual coding mode is applied to the current block.

13. The non-transitory computer-readable medium of claim 10, wherein the method further comprises:
    in response to the CU level lossless mode flag indicating that the lossless coding mode is applied to the current block, determining that (i) a lossy coding mode is not applied to the current block or that (ii) a syntax element indicating whether the lossy coding mode is applied to the current block is not signaled, wherein
    the lossy coding mode is one of:
    joint chroma residual coding mode,
    a combined intra and inter prediction (CIIP) coding mode,
    a quantized residual block-based delta pulse code modulation (BDPCM) coding mode,
    a multiple transform selection (MTS) coding mode,
    a secondary transform (ST) coding mode,
    a dependent quantization coding mode,
    a transform skip (TS) coding mode, or
    a sub-block transform (SBT) coding mode.

* * * * *